United States Patent
Shoji et al.

(10) Patent No.: US 9,521,633 B2
(45) Date of Patent: Dec. 13, 2016

(54) APPARATUS AND METHOD FOR SELECTING AN OPTIMUM BASE STATION WHOSE TRANSMISSION POWER IS TO BE CHANGED

(71) Applicant: FUJITSU LIMITED, Kawasaki-shi, Kanagawa (JP)

(72) Inventors: Yusuke Shoji, Yokohama (JP); Kiyofumi Hara, Yokohama (JP); Kazutoshi Kawamura, Chigasaki (JP); Hiroyuki Ohhashi, Yokohama (JP); Naoya Yamazaki, Yokohama (JP); Kiyoshi Komatsu, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/823,976

(22) Filed: Aug. 11, 2015

(65) Prior Publication Data

US 2016/0066285 A1    Mar. 3, 2016

(30) Foreign Application Priority Data

Aug. 26, 2014 (JP) .................. 2014-171280

(51) Int. Cl.
| | | |
|---|---|---|
| *H04W 88/08* | (2009.01) | |
| *H04W 52/38* | (2009.01) | |
| *H04W 48/20* | (2009.01) | |
| *H04W 52/14* | (2009.01) | |
| *H04W 52/22* | (2009.01) | |

(Continued)

(52) U.S. Cl.
CPC ......... *H04W 52/38* (2013.01); *H04W 28/0226* (2013.01); *H04W 48/20* (2013.01); *H04W 52/143* (2013.01); *H04W 52/225* (2013.01); *H04W 52/267* (2013.01); *H04W 52/283* (2013.01); *H04W 52/386* (2013.01); *H04L 43/0888* (2013.01); *H04W 52/343* (2013.01); *H04W 88/08* (2013.01)

(58) Field of Classification Search
CPC ............................ H04W 88/08; H04W 52/38
USPC ...... 455/522, 69, 456.1, 67.11, 452.2, 452.1, 455/509
See application file for complete search history.

(56) References Cited

U.S. PATENT DOCUMENTS

| | | | | |
|---|---|---|---|---|
| 6,006,096 | A * | 12/1999 | Trompower | H04W 64/00 455/443 |
| 2008/0045235 | A1* | 2/2008 | Kennedy | G01S 5/0252 455/456.1 |

(Continued)

FOREIGN PATENT DOCUMENTS

| | | |
|---|---|---|
| JP | 09-163443 A | 6/1997 |
| JP | 11-215552 A | 8/1999 |

(Continued)

*Primary Examiner* — John J Lee
(74) *Attorney, Agent, or Firm* — Arent Fox LLP

(57) ABSTRACT

An apparatus stores first identification information in association with each of a plurality of base stations, where the first identification information identifies locations included in a wireless area that is formed according to transmission power control by each of the plurality of base stations. The apparatus controls, based on parameters indicating wireless communication capability at a target location that is included in a first wireless area formed by a first base station and identified by the first identification information, transmission power of a second base station which forms a second wireless area including the target location.

19 Claims, 23 Drawing Sheets

(51) Int. Cl.
*H04W 52/26* (2009.01)
*H04W 52/28* (2009.01)
*H04W 28/02* (2009.01)
H04L 12/26 (2006.01)
H04W 52/34 (2009.01)

(56) References Cited

U.S. PATENT DOCUMENTS

2008/0057955 A1* 3/2008 Choi-Grogan .......... H04W 8/04
455/435.1
2013/0314534 A1* 11/2013 Hinman ................ G06Q 10/08
348/143

FOREIGN PATENT DOCUMENTS

JP 11-234739 A 8/1999
JP 2003-037555 A 2/2003

\* cited by examiner

FIG.9

| WIRELESS AREA IDENTIFIER | GRID AREA IDENTIFIER |
|---|---|
| SM#1 | R#0204, R#0205, R#0304, R#0305 |
| ... | ... |
| SM#5 | R#0404, R#0405, R#0406, R#0504, R#0505, R#0506, ... |
| ... | ... |
| SM#7 | R#0409, R#0410, R#0509, R#0510 |
| ... | ... |
| SM#10 | R#0607, R#0608, R#0707, R#0708 |
| ... | ... |

FIG.10

| WIRELESS AREA IDENTIFIER | GRID AREA IDENTIFIER |
|---|---|
| SM#1 | R#0203, R#0204, R#0205, R#0303, R#0304, R#0305, R#0306, R#0404, ... |
| ... | |
| SM#5 | R#0404, R#0405, R#0406, R#0407, R#0504, R#0505, R#0506, R#0507, ... |
| ... | |
| SM#7 | R#0408, R#0409, R#0410, R#0411, R#0508, R#0509, R#0510, R#0511, ... |
| ... | |
| SM#10 | R#0507, R#0508, R#0606, R#0607, R#0608, R#0609, R#0706, R#0707, ... |
| ... | |

FIG.11

| LATITUDE | LONGITUDE | THROUGHPUT |
|---|---|---|
| 35.2638 | 139.3817 | 99.78Mbps |
| 35.2712 | 139.3929 | 89.1Mbps |
| 35.2822 | 139.4111 | 17.8Mbps |
| 35.2944 | 139.4303 | 9.8Mbps |
| 35.3023 | 139.4421 | 67.7Mbps |
| 35.3211 | 139.4590 | 89.9Mbps |
| ⋮ | ⋮ | ⋮ |

FIG.12

| GRID AREA IDENTIFIER | THROUGHPUT |
|---|---|
| R#0405 | 99.78Mbps |
| R#0406 | 89.1Mbps |
| R#0407 | 17.8Mbps |
| R#0408 | 9.8Mbps |
| R#0501 | 67.7Mbps |
| R#0502 | 89.9Mbps |
| ⋮ | ⋮ |

US 9,521,633 B2

APPARATUS AND METHOD FOR SELECTING AN OPTIMUM BASE STATION WHOSE TRANSMISSION POWER IS TO BE CHANGED

CROSS-REFERENCE TO RELATED APPLICATION

This application is based upon and claims the benefit of priority from the prior Japanese Patent Application No. 2014-171280 filed on Aug. 26, 2014, the entire contents of which are incorporated herein by reference.

FIELD

The embodiments discussed herein are related to apparatus and method for selecting an optimum base station whose transmission power is to be changed.

BACKGROUND

There has been known a radio communications system including a plurality of base stations forming a plurality of wireless areas, a plurality of mobile stations communicating with the plurality of base stations through the plurality of wireless areas, and a controller for changing transmission power of the base stations. When the amount of communication traffic in a first base station is greater than a threshold value, the controller increases transmission power of a second base station in the vicinity of the first base station. This allows some of the communication traffic in the first base station to be processed by the second base station.

Related technologies are disclosed in, for example, Japanese Laid-Open Patent Publication No. 2003-037555, Japanese Laid-Open Patent Publication No. 11-215552, Japanese Laid-Open Patent Publication No. 11-234739, and Japanese Laid-Open Patent Publication No. 09-163443.

SUMMARY

According to an aspect of the invention, an apparatus stores first identification information in association with each of a plurality of base stations, where the first identification information identifies locations included in a wireless area that is formed according to transmission power control by each of the plurality of base stations. The apparatus controls, based on parameters indicating wireless communication capability at a target location that is included in a first wireless area formed by a first base station and identified by the first identification information, transmission power of a second base station which forms a second wireless area including the target location.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 9 is a diagram illustrating an example of first wireless area position information stored in a controller, according to an embodiment;

FIG. 10 is a diagram illustrating an example of second wireless area position information stored in a controller, according to an embodiment;

FIG. 11 is a diagram illustrating an example of position information and throughputs received by a controller from each base station, according to an embodiment;

FIG. 12 is a diagram illustrating an example of grid area identifiers and throughputs stored in a controller, according to an embodiment;

DESCRIPTION OF EMBODIMENTS

Figure 1:
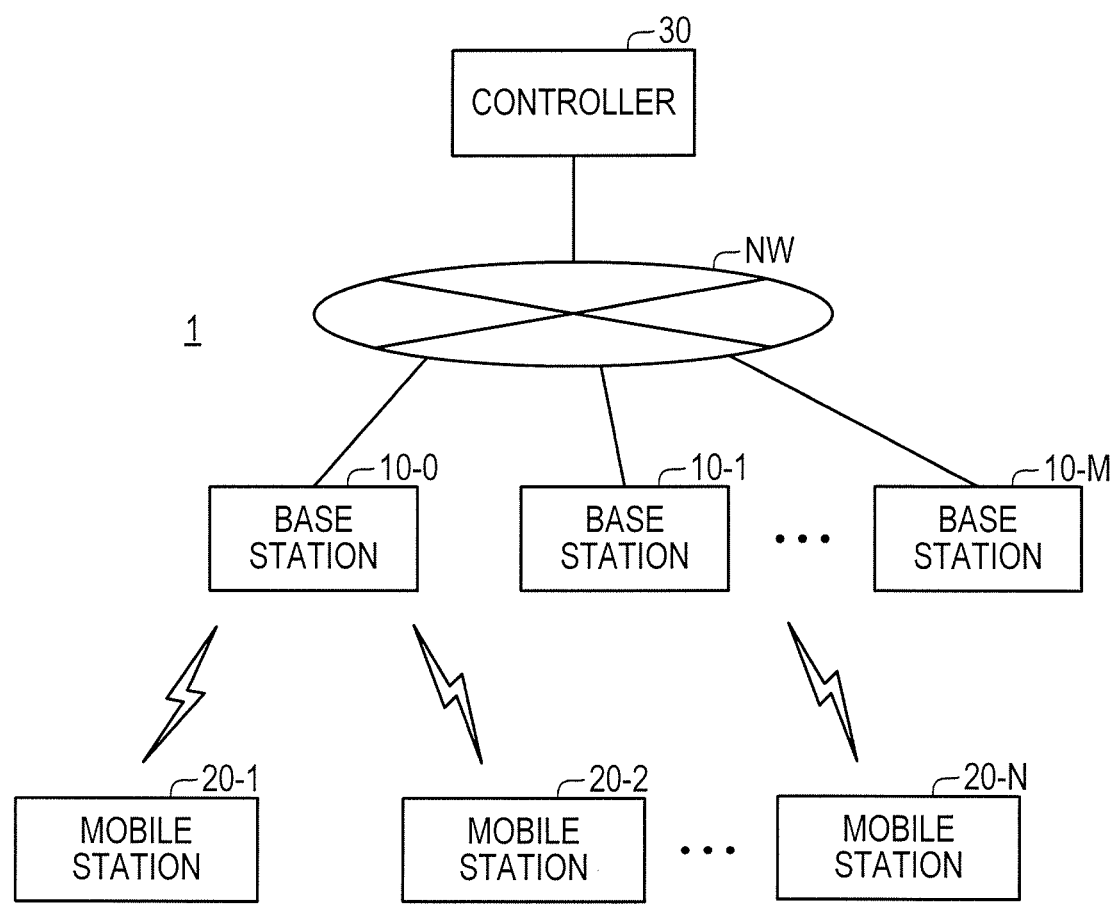
FIG. 1 is a diagram illustrating an example of configuration of a radio communications system, according to an embodiment.

In a conventional radio communication system, the controller does not recognize the locations included in the wireless areas formed by the base stations using the changed transmission power. Therefore, in some cases, if there exists a location where the radio communication capability is not good, the controller may not properly select a base station that is able to deal with the location where the radio communication capability is not good, as a base station whose transmission power is to be changed.

In such cases, even when the transmission power of a base station is changed, a wireless area formed by the base station may not include the location where the radio communication capability is not good. Accordingly, the radio communication capability may not be improved at the location where the radio communication capability is not good.

Hereinafter, embodiments of the present invention will be described with reference to the drawings. It is, however, noted that the following embodiments are illustrative only. Therefore, it is not excluded that other different modifications and techniques unspecified herein are applied to the embodiments. Throughout the drawings used to explain the following description, the same elements and portions are denoted by the same reference numerals unless specified otherwise.

First Embodiment

Configuration

As illustrated in FIG. 1, a radio communications system 1 according to a first embodiment includes M+1 base stations 10-0, 10-1, . . . , 10-M, N mobile stations 20-1, 20-2, . . . , 20-N and a controller 30.

In this example, M represents an integer of two or more. In the following description, base stations 10-$m$ are also collectively referred to as a base station 10 when it is not necessary to distinguish them from each other. The symbol m represents an integer of 0 to M. In this example, N represents an integer of 1 or more. In the following description, the mobile stations 20-$n$ are also collectively referred to as a mobile station 20 when it is not necessary to distinguish them from each other. n represents an integer of 1 to N.

The radio communications system 1 performs a radio communication between the base station 10 and the mobile station 20, based on a radio communication scheme. An example of the radio communication scheme may include an LTE scheme. LTE is an abbreviation of Long Term Evolution. However, the radio communication scheme may be a scheme other than the LTE scheme, such as an LTE-Advanced, or WiMAX. WiMAX is an abbreviation of Worldwide Interoperability for Microwave Access.

Figure 2:
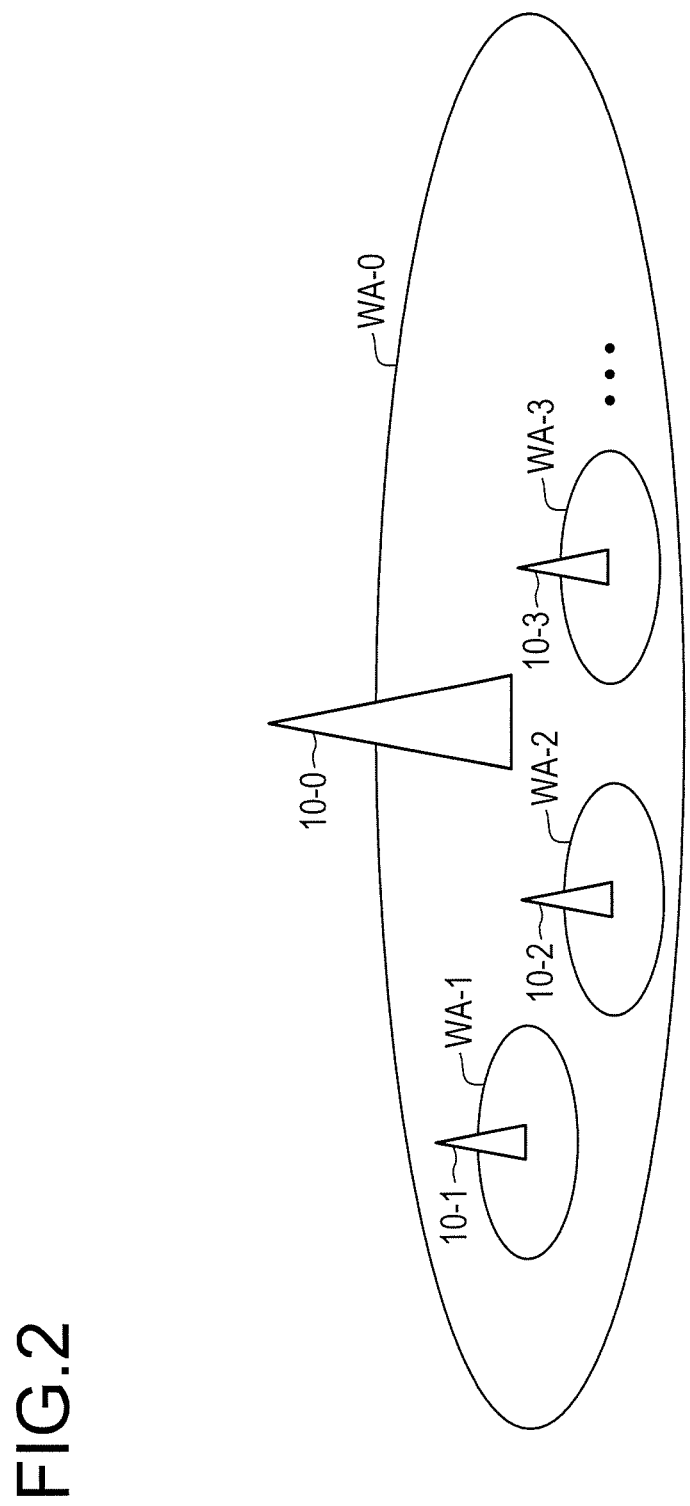
FIG. 2 is a schematic diagram illustrating an example of wireless areas formed by base stations, according to an embodiment.

As illustrated in FIG. 2, the base stations 10-$m$ form their respective wireless areas WA-m. The wireless areas WA-m are also collectively referred to as a wireless area WA when it is not necessary to distinguish them from each other. In the meantime, each base station 10 may form a plurality of wireless areas. The wireless area WA may be expressed as a coverage area or a communication area. For example, the wireless area WA may be represented by a cell such as a macro cell, a micro cell, a nano cell, a pico cell, a femto cell, a home cell, a small cell or a sector cell. Each base station 10 performs a radio communication with a mobile station 20 located within the wireless area WA formed by the base station 10.

Specifically, each base station 10 provides radio resources for the wireless area WS formed by the base station 10. In this example, the radio resources are identified by time and frequency. Each base station 10 utilizes the radio resources provided in the wireless area WA to perform a radio communication with the mobile station 20 located within the wireless area WA formed by the base station 10. In the meantime, each base station 10 may be an access point, an eNB (Evolved Node B) or an NB (Node B).

In this example, a base station 10-0 has a greater maximum value of radio signal transmission power than any other base station 10-$p$. The symbol p represents an integer of 1 to M. Accordingly, the base station 10-0 may form a wireless area WA-0 wider than a wireless area WA-p formed by the base station 10-$p$. In this example, the base station 10-0 is also referred to as a macro base station and the base station 10-$p$ is also referred to as a small base station. Examples of the small base station may include a femto base station, a macro base station, a micro base station, a nano base station, a pico base station, or a home base station.

In this example, the small base station 10-$p$ is placed within the wireless area WA-0 formed by the macro base station 10-0. In addition, the wireless area WA-p formed by the small base station 10-$p$ is located within the wireless area WA-0 formed by the macro base station 10-0. The wireless area WA-0 is also referred to as a macro cell and the wireless area WA-p is also referred to as a small cell. In this example, the radio communications system 1 forms a HetNet (Heterogeneous Network).

In this example, as illustrated in FIG. 1, each base station 10 is connected to a communication network NW (e.g., a core network) to perform a wired communication therewith via a communication line. However, each base station 10 may be connected to the communication network NW to perform a radio communication therewith. An interface between the base station 10 and the communication network NW may be represented by an S1 interface. In addition, an interface between a base station 10 and another base station 10 may be represented by an X2 interface.

An upper portion of the radio communications systems 1 at the side of the communication network NW above the base station 10 may be represented as EPC. EPC is an abbreviation of Evolved Packet Core. A portion of the radio communications system 1 formed by the base station 10 may be represented as E-UTRAN. E-UTRAN is an abbreviation of Evolved Universal Terrestrial Radio Access Network.

The mobile station 20 utilizes radio resources provided for the wireless area WA within which the mobile station 20 is located, to perform a radio communication with the base station 10 forming the wireless area WA. The mobile station 20 may be represented as a wireless terminal, wireless equipment, a wireless device, a mobile terminal, or a UE (User Equipment). Examples of the mobile station 20 may include a mobile phone, a smartphone, a sensor, or a meter (e.g., a measuring device). The mobile station 20 may be carried by a user, may be equipped in a moving body such as a vehicle, or may be stationary.

In this example, the wireless area WA accommodating the mobile station 20 is also referred to as a serving cell. One example of accommodation of the mobile station 20 in the wireless area WA is that the mobile station 20 is connected with the base station 10 forming the wireless area WA so as to exchange data with the base station 10 by using the radio resources provided for the wireless area WA.

The controller 30 is connected to the communication network NW so as to perform a wired communication therewith via a communication line. In this example, the controller 30 is connected with each base station 10 to be communicated with each other via the communication network NW. The controller 30 may be represented as a control station, a management device, a control server, or a management server.

(Configuration; Base Station 10)

Figure 3:
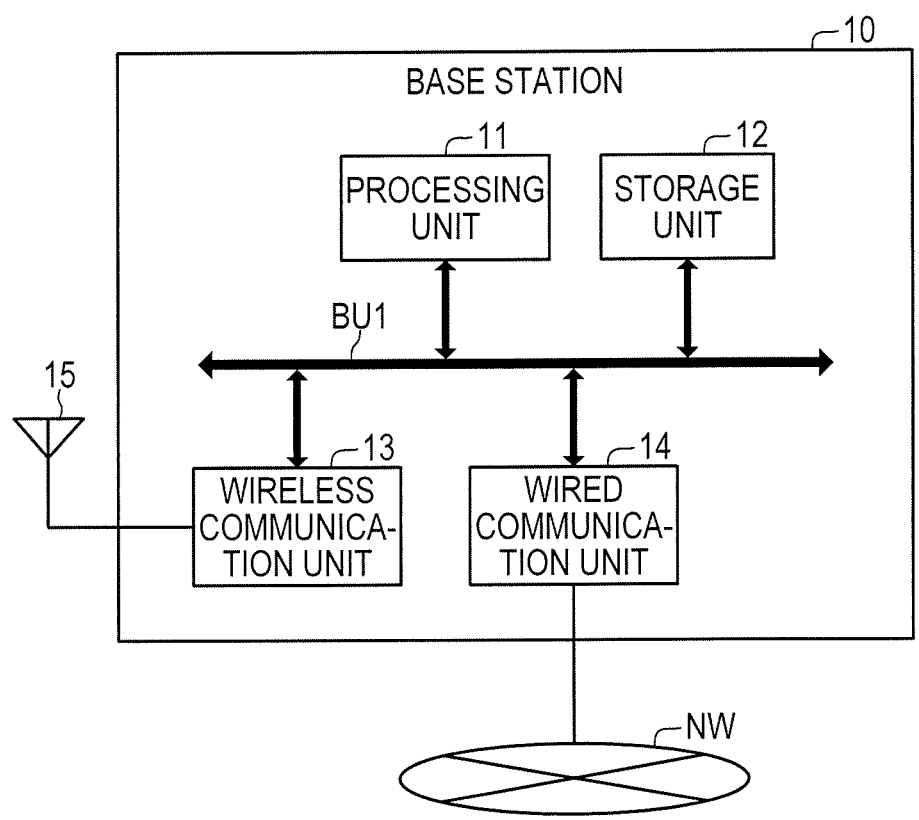
FIG. 3 is a diagram illustrating an example of configuration of a base station, according to an embodiment.

Next, the configuration of the base station 10 will be described. As illustrated in FIG. 3, the base station 10 includes a processing unit 11, a storage unit 12, a wireless communication unit 13, and a wired communication unit 14, all of which are interconnected via a bus BU1.

The processing unit 11 controls other units of the base station 10 in order to implement functionalities to be described later. In this example, the processing unit 11 is a central processing unit (CPU). In this example, the processing unit 11 implements the functionalities to be described later by executing a program stored in the storage unit 12.

The functionality of the processing unit 11 may be implemented by an LSI (Large Scale Integration) or PLD (Programmable Logic Device).

For example, the storage unit 12 includes at least one of RAM, ROM, HDD, SDD, a semiconductor memory, and an organic memory. RAM is an abbreviation of Random Access Memory. ROM is an abbreviation of Read Only Memory. HDD is an abbreviation of Hard Disk Drive. SDD is an abbreviation of Solid State Drive. The storage unit 12 may include a recording medium, such as a flexible disk, an optical disc, a magneto-optical disk, or a semiconductor memory, and a reader capable of reading information from the recording medium.

The wireless communication unit 13 includes an antenna 15 and communicates with the mobile station 20 accommodated in the wireless area WA formed through the antenna 15, according to a wireless communication scheme (e.g., an LTE scheme in this example). In this example, the functionality of the wireless communication unit 13 is implemented by executing a program held by a DSP (Digital Signal Processor). The wireless communication unit 13 may be implemented by an LSI.

In this example, the wireless communication unit 13 has the function to change the power of a radio signal transmitted via the antenna 15 (e.g., a transmission power), as will be described later. The wireless area WA formed by the wireless communication unit 13 varies with the change of the transmission power. Changing the transmission power is one example of a transmission power control.

The wired communication unit 14 includes a communication port to which a communication cable may be connected. When the wired communication unit 14 is connected to the communication network NW via the communication cable, the wired communication unit 14 communicates with other devices (e.g., the controller 30) connected to the communication network NW, according to a wired LAN scheme. An example of the wired LAN scheme is the IEEE 802.3 series. The wired LAN scheme is one example of a wired communication scheme. For example, the wired LAN scheme may be the Ethernet®.

(Configuration; Mobile Station 20)

Figure 4:
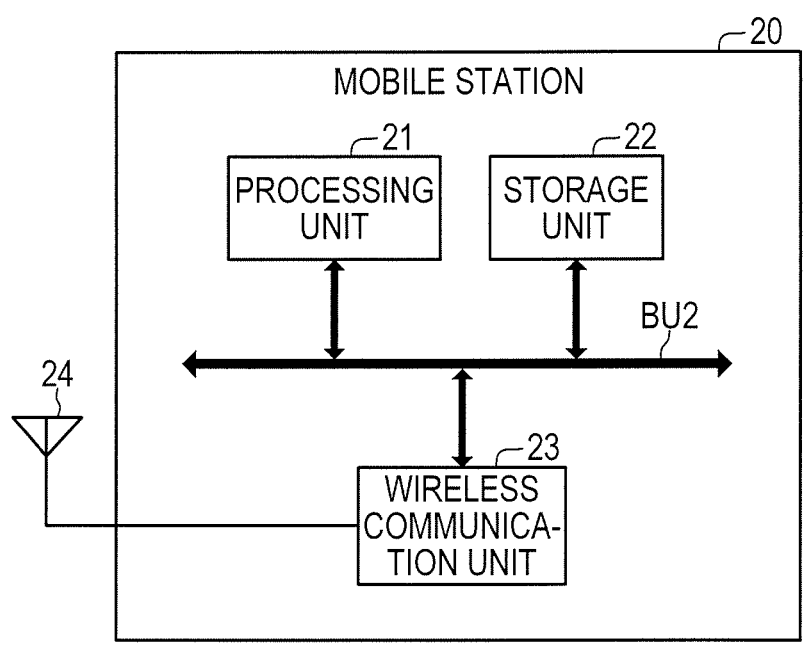
FIG. 4 is a diagram illustrating an example of configuration of a mobile station, according to an embodiment.

As illustrated in FIG. 4, the mobile station 20 includes a processing unit 21, a storage unit 22, and a wireless communication unit 23, all of which are interconnected via a bus BU2.

The processing unit 21 has the same functionality as the processing unit 11. The storage unit 22 has the same functionality as the storage unit 12.

The wireless communication unit 23 includes an antenna 24 and communicates with the base station 10 forming the wireless area WA accommodating the base station through the antenna 24, according to a wireless communication scheme (e.g., an LTE scheme in this example).

(Configuration; Controller 30)

Figure 5:
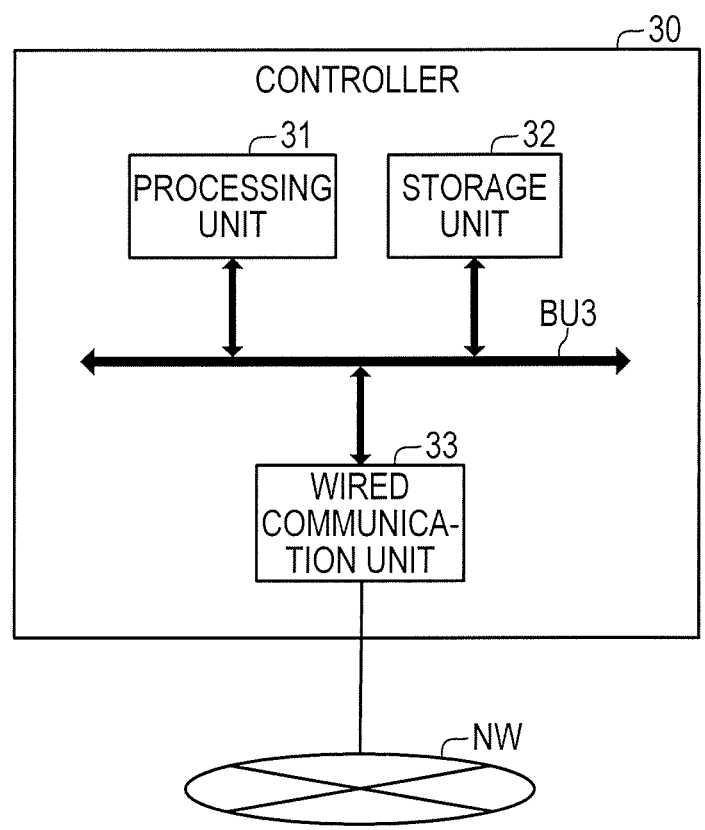
FIG. 5 is a diagram illustrating an example of configuration of a controller, according to an embodiment.

As illustrated in FIG. 5, the controller 30 includes a processing unit 31, a storage unit 32, and a wired communication unit 33, all of which are interconnected via a bus BU3. The processing unit 31 controls other units of the controller 30 in order to implement functionalities to be described later, as in the processing unit 11. The storage unit 32 has the same functionality as the storage unit 12.

The wired communication unit 33 has the same functionality as the wired communication unit 14. When the wired communication unit 33 is connected to the communication network NW via a communication cable, the wired communication unit 33 communicates with other devices (e.g., the base station 10) connected to the communication network NW, according to a wired LAN scheme.

(Functionality; Base Station 10)

Figure 6:
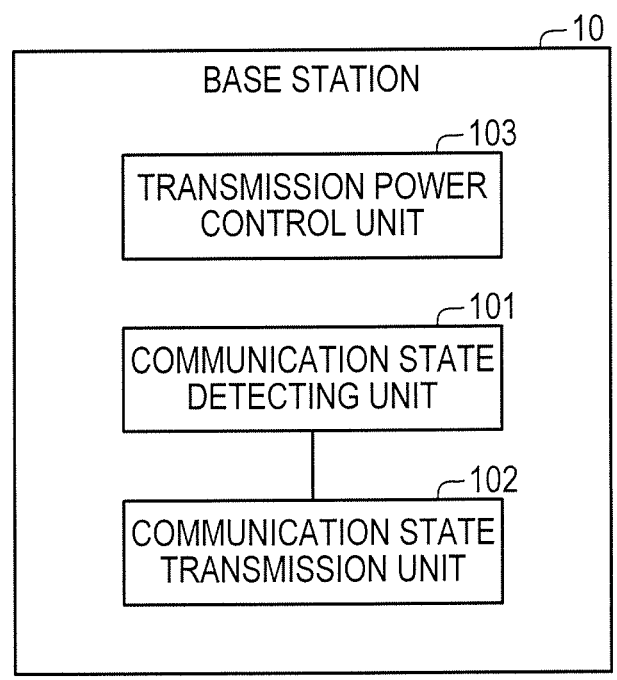
FIG. 6 is a diagram illustrating an example of functionality of a base station, according to an embodiment.

Next, the functionality of the base station 10 will be described. As illustrated in FIG. 6, the functionality of the base station 10 includes a communication state detecting unit 101, a communication state transmission unit 102, and a transmission power control unit 103.

The communication state detecting unit 101 receives position information from each of the mobile stations 20 accommodated in the wireless area WA formed by the base station 10. The reception of the position information may be represented as an acquisition of the position information. The position information is information indicating a location of the mobile station 20. In this example, the position information is information indicating a location measured by the mobile station 20 by using a GPS (Global Positioning System). The measurement may be represented as a detection. In this example, the position information includes the latitude and the longitude.

In addition, the communication state detecting unit 101 measures a throughput for each mobile station 20 accommodated in the wireless area WA formed by the base station 10. The measurement of the throughput may be represented as an acquisition of the throughput. The throughput represents the amount of data communicated between the mobile station 20 and the base station 10 per unit time. The throughput is one example of a parameter representing a state of communication between the mobile station 20 and the base station 10. In this example, the communication state indicates a wireless communication performance.

The mobile station 20 may measure the throughput instead of the base station 10. In this case, the communication state detecting unit 101 may receive the throughput from each mobile station 20 accommodated in the wireless area WA formed by the base station 10.

The communication state transmission unit 102 receives a communication state request transmitted by the controller 30, as will be described later. The communication state request is information requesting transmission of a parameter (e.g., throughput in this example) indicating the communication state.

In this example, in response to the received communication state request, the communication state transmission unit 102 transmits the position information and the throughput in association therewith, which have been acquired by the communication state detecting unit 101 for each mobile station 20 accommodated in the wireless area WA formed by the base station 10, to the controller 30. The communication state transmission unit 102 may transmit the position information and the throughput to the controller 30 every time a predetermined period elapses.

The transmission power control unit 103 receives a power change instruction transmitted by the controller 30, as will be described later. The power change instruction is information instructing a change of transmission power of a radio signal. In this example, the power change instruction includes information indicating changed transmission power. For example, the transmission power may be represented as an antenna power or a transmission output.

In response to the received power change instruction, the transmission power control unit 103 changes the radio signal transmission power for the base station 10. Thus, a location included in the wireless area WA formed by the base station 10 is changed. For example, a location of the boundary of the wireless area WA formed by the base station 10 is changed. For example, the area of the wireless area WA formed by the base station 10 is changed.

In this example, when the change of transmission power for the base station 10 is completed, the transmission power control unit 103 transmits a power change response indicating the completion of the transmission power change to the controller 30.

In the meantime, even when the change of transmission power for the base station 10 is completed, the transmission power control unit 103 may not transmit the power change response to the controller 30.

The functionality of the macro base station 10-0 may not require the transmission power control unit 103.

(Functionality; Controller 30)

Figure 7:
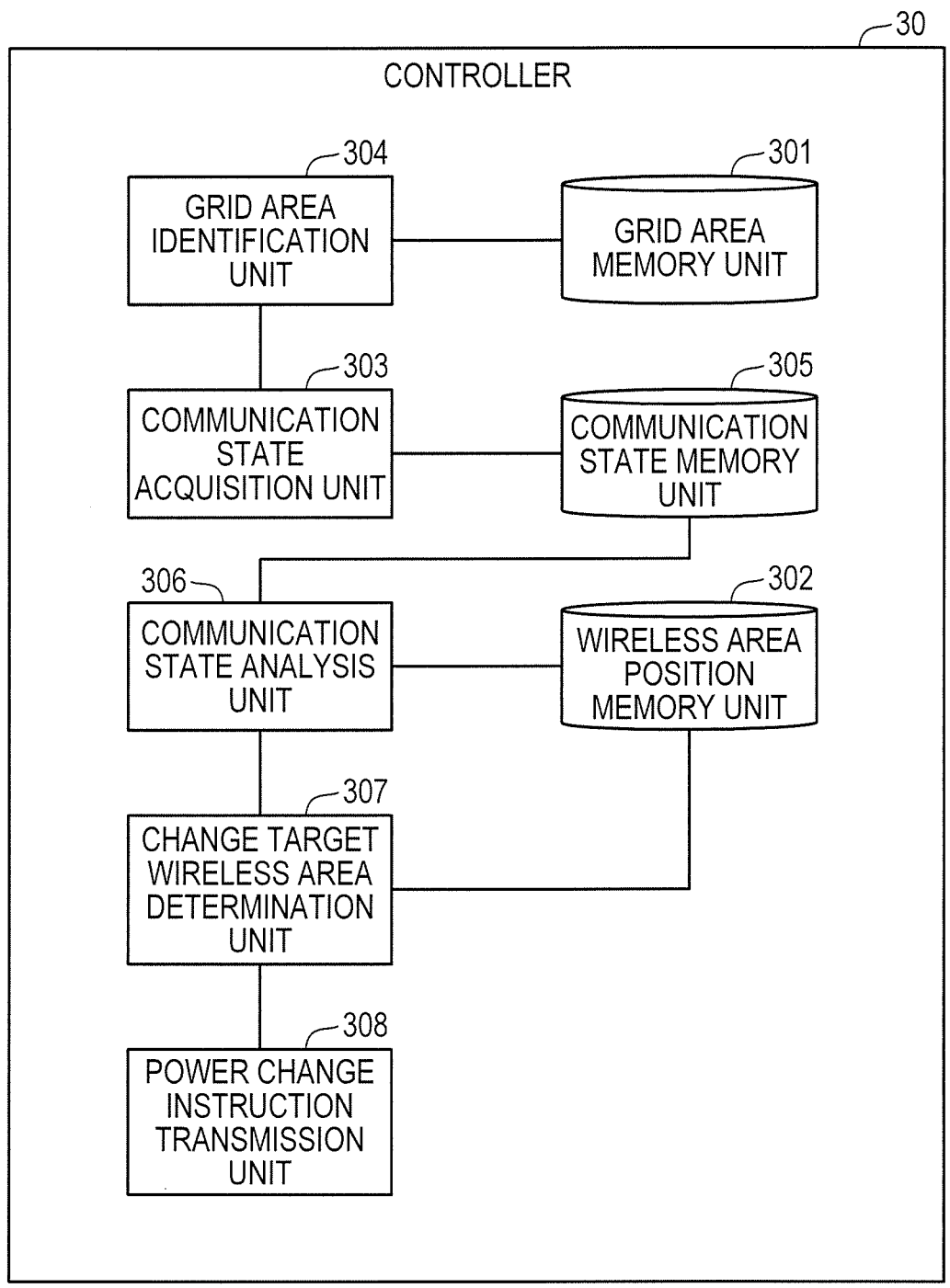
FIG. 7 is a diagram illustrating an example of functionality of a controller, according to an embodiment.

Next, the functionality of the controller 30 will be described. As illustrated in FIG. 7, the functionality of the controller 30 includes a grid area memory unit 301, a wireless area position memory unit 302, a communication state acquisition unit 303, a grid area identification unit 304, and a communication state memory unit 305. Illustratively, the functionality of the controller 30 further includes a communication state analysis unit 306, a change target wireless area determination unit 307, and a power change instruction transmission unit 308.

The grid area memory unit 301 stores information associating grid areas with locations included in the grid areas.

Figure 8:
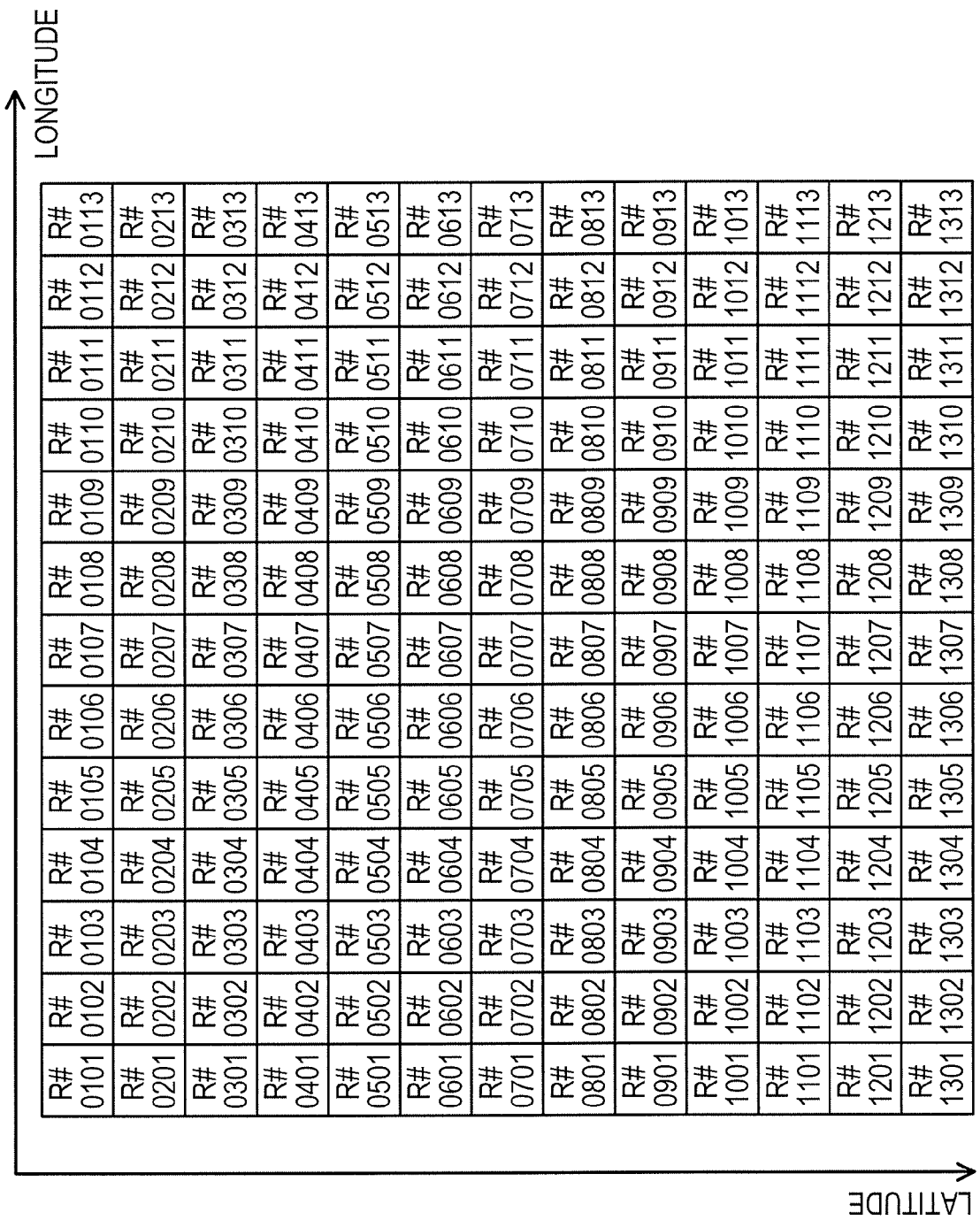
FIG. 8 is a diagram illustrating an example of grid areas used by a radio communication system, according to an embodiment.

In this example, each of the grid areas is a square area. In this example, as illustrated in FIG. 8, the grid areas are partitioned by grids formed by a plurality of latitudinal lines arranged at equal intervals to provide a predetermined latitude interval and a plurality of longitudinal lines arranged at equal intervals to provide a predetermined longitude interval. In this example, R#XY represents a grid area identifier identifying a grid area. Each of X and Y represents a two-digit integer.

In this example, the latitude interval is $1.5\pi/648000$[rad] (1.5 [sec]) and the longitude interval is $2.25\pi/648000$[rad] (2.25 [sec]). In this example, the length of one side of each grid area is about 50 m.

For example, the grid areas may be areas formed by dividing a ½ local mesh, which is a divided local mesh defined by the Ministry of Internal Affairs and Communications, into 10 equal parts in each of a latitude direction and a longitude direction.

In this example, the grid area memory unit 301 stores grid area identifiers identifying the grid areas, the latitude and longitude at the northernmost and westernmost locations of the grid areas, and the latitude and longitude at the southernmost and easternmost locations of the grid areas, in association with each other.

The wireless area position memory unit 302 stores a plurality of wireless area position information corresponding respectively to a plurality of transmission powers for each small base station 10-$p$.

The wireless area position information identifies locations included in the wireless area WA-p which may be formed by the small base station 10-$p$, using the transmission power corresponding to the wireless area position information. In this example, as illustrated in FIGS. 9 and 10, the wireless area position information is information associating wireless area identifiers identifying the wireless areas WA with grid area identifiers identifying the grid areas included in the wireless areas WA. The wireless area position information is one example of identification information. For example, the wireless area position information may be acquired by measuring reception strength of radio signals, which are transmitted by the small base stations 10-$p$, at plural locations.

In this example, the wireless area position memory unit 302 stores first wireless area position information corresponding to first transmission power and second wireless area position information corresponding to second transmission power for each small base station 10-$p$. FIGS. 9 and 10 illustrate examples of the first wireless area position information and the second wireless area position information, respectively. In this example, SM#Z represents a wireless area identifier identifying the wireless areas WA, where Z represents an integer of 1 or more.

In this example, the first transmission power is set as a radio signal transmission power for the small base stations 10-$p$ at the start-up of the small base stations 10-$p$. The first transmission power may be varied for different small base stations 10-$p$. In the meantime, the first transmission power may be common to the plurality of small base stations 10-$p$. In this example, the second transmission power is greater than the first transmission power.

The first wireless area position information is one example of information identifying locations included in the wireless areas WA-p which may be formed by the small base stations 10-$p$ by using the first transmission power. The second wireless area position information is one example of information identifying locations included in the wireless areas WA-p which may be formed by the small base stations 10-$p$ by using the second transmission power.

The wireless area position memory unit 302 is one example of a memory unit storing the identification information identifying locations included in the wireless areas.

The communication state acquisition unit 303 acquires the location of the mobile station 20 and a parameter (e.g., throughput in this example) indicating the state of communication between the mobile station 20 and the base station 10.

In this example, the communication state acquisition unit 303 transmits the communication state request to each base station 10 every time a predetermined period elapses. Alternatively, in response to an instruction input to the controller 30, the communication state acquisition unit 303 may transmit the communication state request. In addition, when abnormality of the radio communications system 1 is detected, the communication state acquisition unit 303 may transmit the communication state request.

As illustrated in FIG. 11, the communication state acquisition unit 303 receives the position information and the throughput which are associated with each other, from each base station 10. The reception of the position information and the throughput is one example of acquisition of the position information and the throughput. The communication state acquisition unit 303 is one example of an acquisition unit acquiring a location of the mobile station 20 and a parameter indicating the state of communication between the mobile station 20 and the base station 10.

The grid area identification unit 304 identifies the grid areas including the locations indicated by the position information acquired by the communication state acquisition unit 303, based on the information stored in the grid area memory unit 301.

The communication state memory unit 305 stores the throughputs acquired by the communication state acquisition 303 and the grid areas identified by the grid area identification unit 304 based on the position information associated with the throughputs, in association with each other. In this example, as illustrated in FIG. 12, the communication state memory unit 305 stores the throughputs and the grid area identifiers in association with each other.

The communication state analysis unit 306 analyzes the communication states for the wireless area WA-p formed by the small base stations 10-$p$. In this example, the analysis on the communication states includes calculating an average of the throughputs for the wireless areas WA-p. In this example, an analysis on the communication states is performed based on the information stored in the communication state memory unit 305 and the first wireless area position information stored in the wireless area position memory unit 302.

In this example, the communication state analysis unit 306 extracts the throughputs corresponding to the grid area identifiers associated with the wireless area identifiers, based on the first wireless area position information, from the throughputs that are stored in the communication state memory unit 305 for the respective wireless area identifiers. The communication state analysis unit 306 calculates, for each of the wireless area identifiers, a value obtained, by dividing the sum of the throughputs extracted for each wireless area identifier, by the total of the extracted throughputs, thereby obtaining an average of the throughputs for a wireless area WA-p identified by each of the wireless area identifiers.

The communication state analysis unit 306 extracts a wireless area WA whose communication state is not good, from the wireless areas WA-p formed by the small base stations 10-$p$, based on a result of the analysis. In this example, the communication state analysis unit 306 extracts a wireless area WA having an average throughput value lower than a first threshold value, as a wireless area WA whose communication state is not good. The extracted wireless area WA is one example of the first wireless area.

The change target wireless area determination unit 307 extracts a grid area included in the wireless area WA extracted by the communication state analysis unit 306, from the plurality of grid areas, based on the first wireless area position information stored in the wireless area position memory unit 302. The extracted grid area is one example of the target location.

The change target wireless area determination unit 307 determines a change target wireless area for each extracted grid area. The change target wireless area is a wireless area WA whose transmission power is to be changed. In this example, the determination on the change target wireless area is made based on the second wireless area position information stored in the wireless area position memory unit 302.

In this example, the change target wireless area determination unit 307 determines, as a change target wireless area, a wireless area WA identified by a wireless area identifier that is associated, in the second wireless area position information, with a grid area identifier identifying the extracted grid area.

In this example, when a grid area identifier is associated with a plurality of wireless area identifiers in the second wireless area position information, the change target wireless area determination unit 307 selects one of the wireless areas WA identified by the plurality of wireless area identifiers. The wireless areas WA identified by the plurality of wireless area identifiers may be represented as candidates for the change target wireless area.

In this case, in this example, the change target wireless area determination unit 307 selects a wireless area WA having the maximum average of throughputs calculated by the communication state analysis unit 306, from a plurality of change target wireless area candidates. The change target wireless area determination unit 307 determines the selected wireless area WA as a change target wireless area.

In this example, the wireless area WA determined as the change target wireless is different from the wireless area WA extracted by the communication state analysis unit 306. The wireless area WA determined as the change target wireless is one example of the second wireless area.

The power change instruction transmission unit 308 transmits a power change instruction to a small base stations 10-$p$ forming the wireless area WA determined as the change target wireless by the change target wireless area determination unit 307. In this example, the power change instruction includes information indicating a second transmission power as the changed transmission power.

The communication state analysis unit 306, the change target wireless area determination unit 307, and the power change instruction transmission unit 308 are one example of the controller which changes the transmission power of the small base station 10-$p$ from the first transmission power to the second transmission power.

(Operation)

First, processes performed by the radio communications system 1 will be described with reference to FIGS. 13 to 15.

Figure 13:
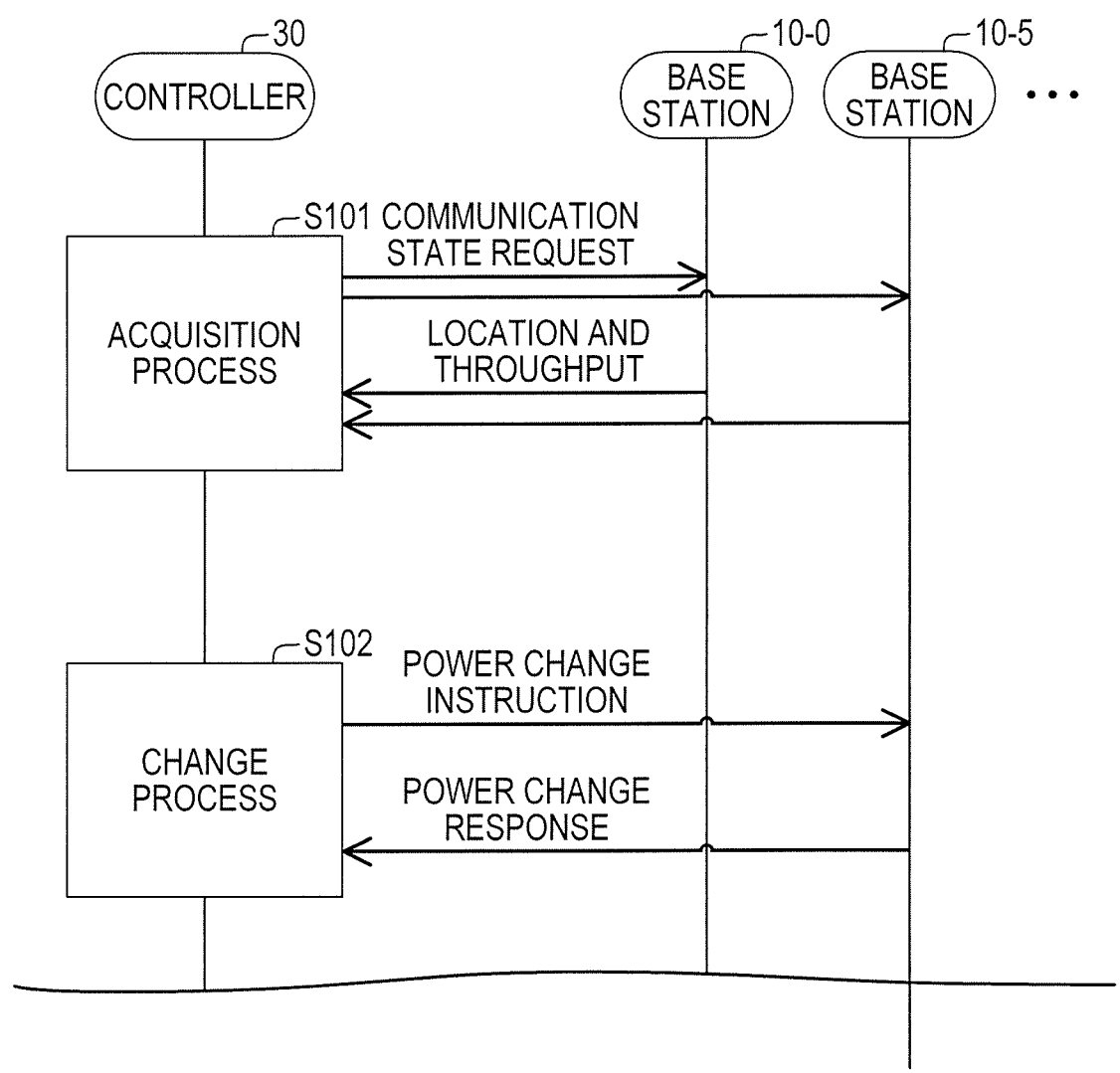
FIG. 13 is a diagram illustrating an example of an operational sequence performed by a radio communication system, according to an embodiment.

The radio communications system 1 performs the processes illustrated in FIG. 13. First, the controller 30 performs an acquisition process (step S101 in FIG. 13). In the acquisition process, the controller 30 transmits a communication state request to each base station 10 and receives position information and a throughput transmitted by each base station 10 in response to the communication state request.

Next, the controller 30 performs a change process (step S102 in FIG. 13). In the change process, the controller 30 transmits a power change instruction to a particular base station 10 and receives a power change response transmitted by the particular base station 10 in response to the power change instruction.

The radio communications system 1 may repeat the processes of steps S101 and S102 in FIG. 13. For example, the radio communications system 1 may perform the processes of steps S101 and S102 in FIG. 13 every time a predetermined period elapses. In addition, the radio communications system 1 may perform the processes of steps S101 and S102 in FIG. 13 when an abnormality is detected in the radio communications system 1. In addition, the radio communications system 1 may perform the processes of steps S101 and S102 in FIG. 13 when the controller 30 receives a predetermined signal.

Here, one example of the acquisition process will be described. For example, as the acquisition process, the controller 30 performs a process illustrated by a flowchart in FIG. 14.

Figure 14:
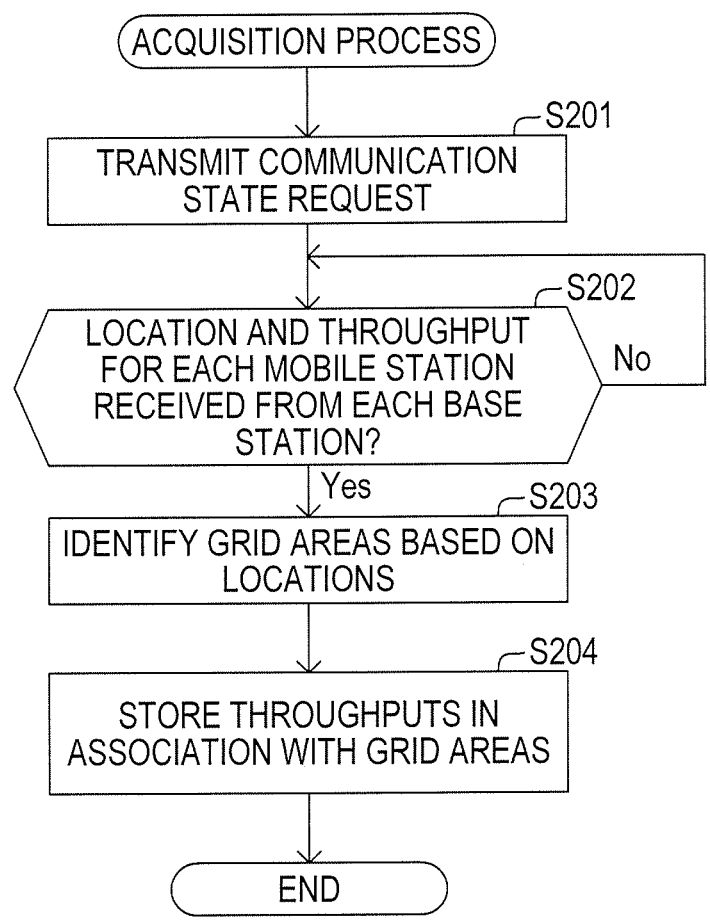
FIG. 14 is a diagram illustrating an example of an operational flowchart for an acquisition process performed by a controller, according to an embodiment.

At the starting of the process of FIG. 14, the controller 30 transmits a communication state request to each base station 10 (step S201 in FIG. 14).

Next, the controller 30 waits until it receives position information and a throughput for each mobile station 20 from each base station 10 ("NO" at step S202 in FIG. 14).

Upon receiving the position information and the throughput for each mobile station 20 from each base station 10 ("YES" at step S202 in FIG. 14), the controller 30 identifies a grid area for each of locations included in the received position information (step S203 in FIG. 14).

Thereafter, the controller 30 stores the received throughputs and information on the grid areas that are identified based on the received position information associated with the throughputs, in association with each other (step S204 in FIG. 14). Then, the controller 30 ends the acquisition process.

Here, one example of the change process will be described. For example, as the change process, the controller 30 performs a process illustrated by an operational flowchart in FIG. 15.

Figure 15:
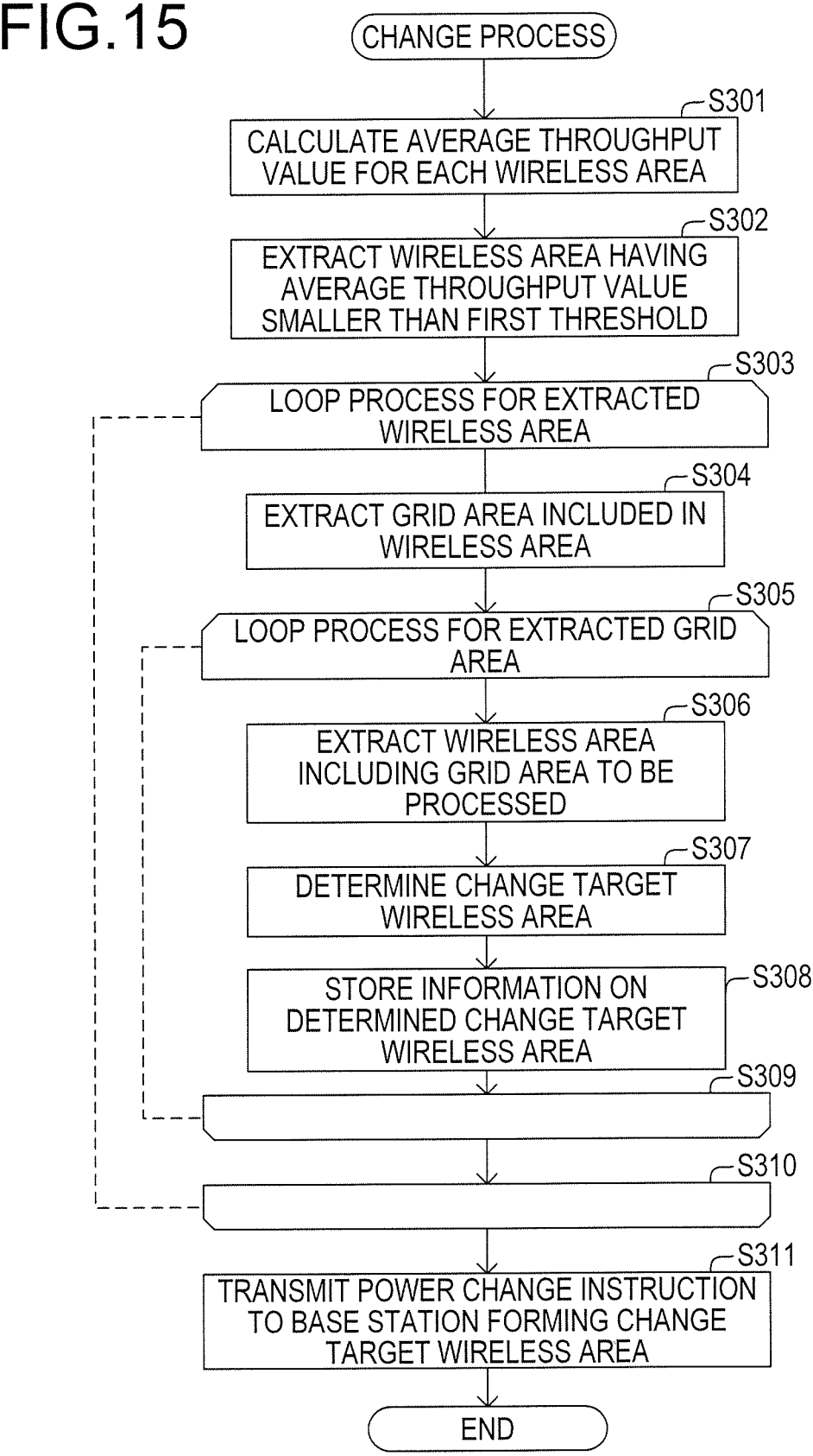
FIG. 15 is a diagram illustrating an example of an operational flowchart for a change process performed by a controller, according to an embodiment.

At the starting of the process of FIG. 15, the controller 30 calculates an average of throughputs for each wireless area based on the throughputs that are stored in association with the grid areas (step S301 in FIG. 15). In this example, the controller 30 identifies the wireless areas including the grid areas, based on the first wireless area position information corresponding to the first transmission power.

Next, the controller 30 extracts a wireless area WA-p having an average throughput value lower than the first threshold value, from among the wireless areas WA-p formed by the respective small base stations 10-p (step S302 in FIG. 15).

Then, the controller 30 performs a first loop process (steps S303 to S310 in FIG. 15) that sequentially uses the extracted wireless areas WA-p as a target to be processed.

In the first loop process, the controller 30 extracts grid areas included in the wireless areas WP-p to be processed, from among the plurality of grid areas, based on the first wireless area position information corresponding to the first transmission power (step S304 in FIG. 15).

Then, the controller 30 performs a second loop process (steps S305 to S309 in FIG. 15) that sequentially uses the extracted grid areas as a target to be processed.

In the second loop process, the controller 30 extracts a wireless area including the grid area to be processed, from among the wireless areas WA-p formed by each small base station 10-p, based on the second wireless area position information corresponding to the second transmission power (step S306 in FIG. 15).

Next, the controller 30 determines the change target wireless area, based on the extracted wireless areas WA-p (step S307 in FIG. 15).

In this example, when one wireless area WA-p is extracted, the controller 30 determines the extracted wireless area WA-p as the change target wireless area. In this example, when two or more wireless areas WA-p are extracted, the controller 30 selects one of the extracted wireless areas WA-p and determines the selected wireless area WA-p as the change target wireless area. In this case, in this example, the controller 30 selects a wireless area WA-p having the maximum average of throughputs from among the extracted wireless areas WA-p.

Then, the controller 30 stores information on the determined change target wireless area (step S308 in FIG. 15).

Next, the controller 30 performs the second loop process (steps S305 to S309 in FIG. 15) for all of the grid areas extracted at step S304 and then proceeds to step S310.

Thereafter, the controller 30 performs the first loop process (steps S303 to S310 in FIG. 15) for all of the wireless areas WA-p extracted in Step S302 and then proceeds to Step S311.

Next, the controller 30 transmits a power change instruction to a small base station 10-p forming each of the change target wireless areas (Step S311 in FIG. 15). Then, the controller 30 ends the change process.

Upon receiving the power change instruction from the controller 30, the small base station 10-p changes the radio signal transmission power for the small base station 10-p from the first transmission power to the second transmission power, according to the received power change instruction. Thus, a location included in the wireless area WA-p formed by the small base station 10-p is changed. Next, when the change of the transmission power for the small base station 10-p is completed, the small base station 10-p transmits, to the controller 30, a power change response indicating that the change of the transmission power is completed.

Next, one example of the operation of the radio communications system 1 will be described with reference to FIGS. 16 to 19.

Figure 16:
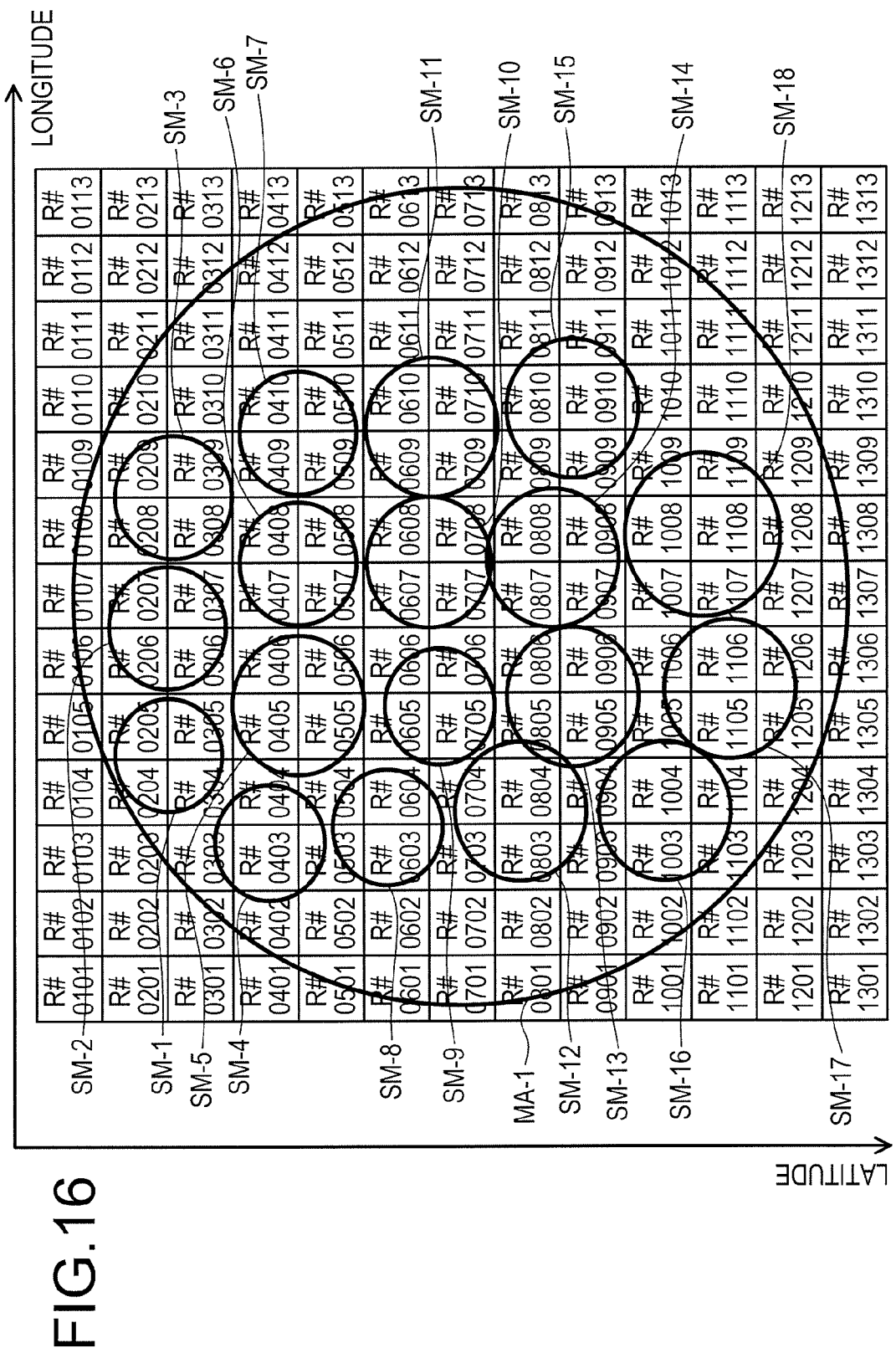
FIG. 16 is a diagram illustrating an ample of a relationship between wireless areas and grid areas formed by base stations, according to an embodiment.

As illustrated in FIG. 16, it is here assumed that each small base station 10-q uses the first transmission power to form a wireless area SM-q. The symbol q represents an integer of 1 to 18. In this example, each wireless area SM-q is located within a wireless area MA-1 formed by the macro base station 10-0.

Figure 17:
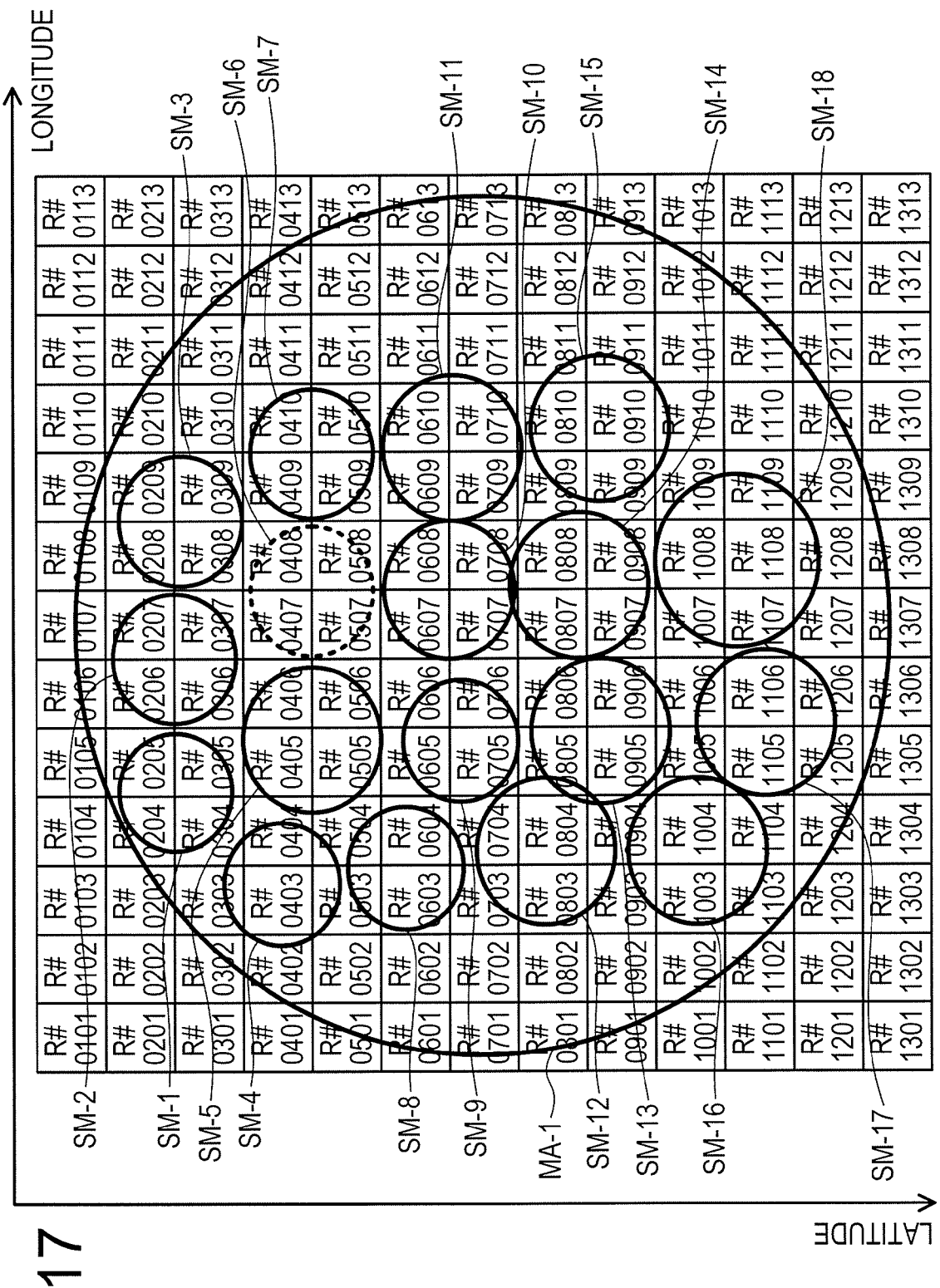
FIG. 17 is a diagram illustrating an example of a relationship between wireless areas and grid areas formed by base stations, according to an embodiment.

In this case, it is assumed that a small base station 10-6 is stopped. In this case, as illustrated in FIG. 17, a wireless area which accommodates the mobile stations 20 located in four grid areas identified by R#0407, R#0408, R#0507 and R#0508 is changed from the wireless area SM-6 to the wireless area MA-1.

Incidentally, the number of mobile stations 20 accommodated by the wireless area MA-1 formed by the macro base station 10-0 is likely to be greater than the number of mobile stations 20 accommodated by the wireless area SM-q formed by the small base station 10-q. Therefore, a throughput for the wireless area MA-1 formed by the macro base station 10-0 is likely to be smaller than a throughput for the wireless area SM-q formed by the small base station 10-q.

In this example, it is assumed that an average throughput value for the wireless area SM-6, which has been formed before the small base station 10-6 is stopped, becomes smaller than the first threshold value as a result of stopping the small base station 10-6. Accordingly, in this case, at step S302 in FIG. 15, the controller 30 extracts the wireless area SM-6 from a plurality of wireless areas SM-q included in the wireless area MA-1. The extracted wireless area SM-6 is one example of the first wireless area.

Next, at step S304 in FIG. 15, the controller 30 extracts the four grid areas identified by R#0407, R#0408, R#0507, and R#0508, as grid areas included in the wireless area SM-6, from a plurality of grid areas.

Figure 18:
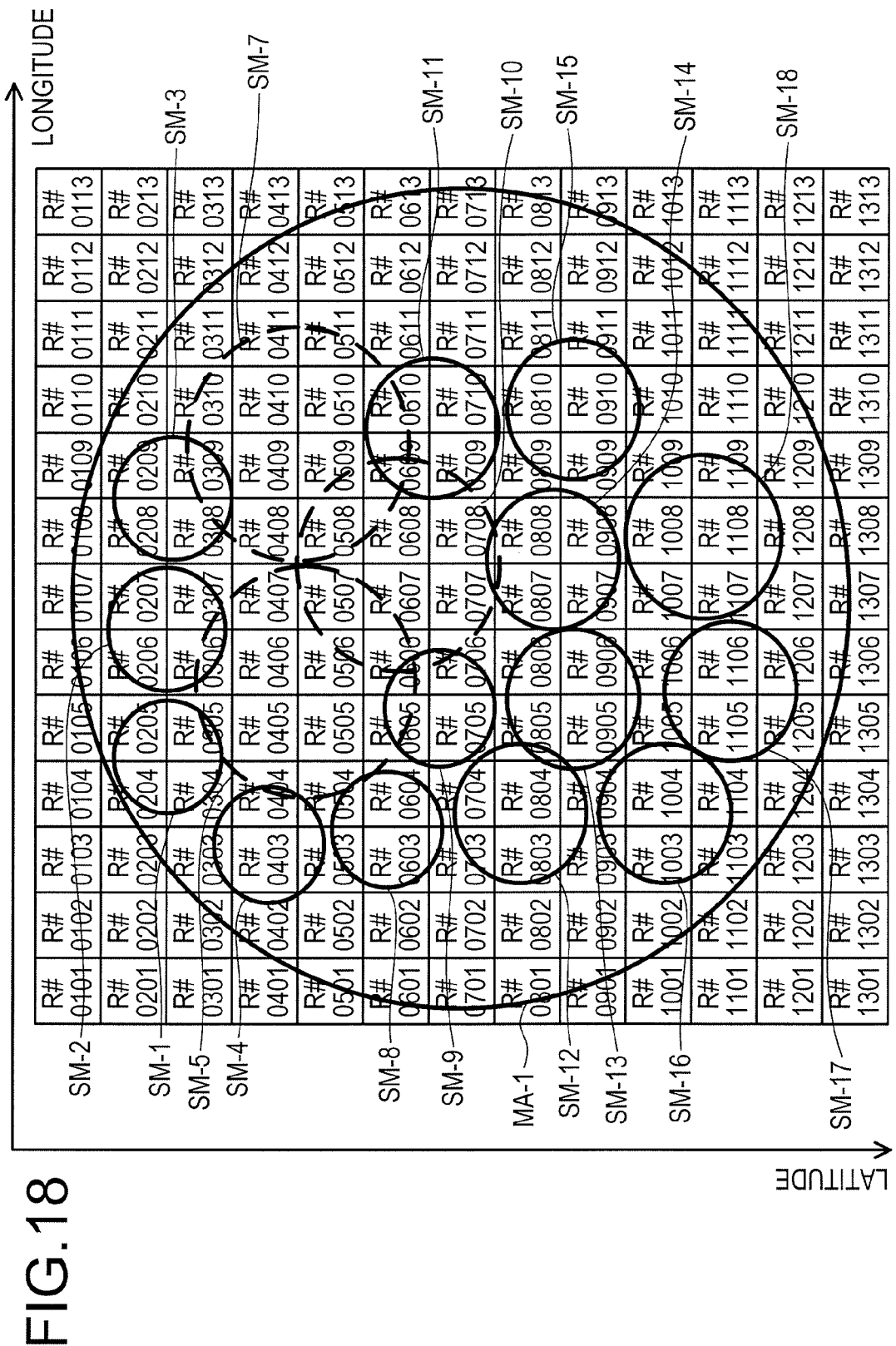
FIG. 18 is a diagram illustrating an example of a relationship between wireless areas and grid areas formed by base stations, according to an embodiment.

In this example, as illustrated in FIG. 18, it is assumed that a wireless area SM-5, which may be formed by a small base station 10-5 using the second transmission power, includes two grid areas identified by R#0407 and R#0507. In this example, it is also assumed that a wireless area SM-7, which may be formed by a small base station 10-7 using the second transmission power, includes two grid areas identified by R#0408 and R#0508. In this example, it is further assumed that a wireless area SM-10, which may be formed by a small base station 10-10 using the second transmission power, includes two grid areas identified by R#0507 and R#0508.

Accordingly, at step S306 in FIG. 15, the controller 30 extracts the wireless area SM-5 as a wireless area including the grid area identified by R#0407 from a plurality of wireless areas SM-q included in the wireless area MA-1. Next, at step S307 in FIG. 15, the controller 30 determines the extracted wireless area SM-5 as a change target wireless area. Then, at step S308 in FIG. 15, the controller 30 stores information on the determined change target wireless area SM-5. The grid area identified by R#0407 is one example of the target location. The wireless area SM-5 is one example of the second wireless area.

In addition, at step S306 in FIG. 15, the controller 30 extracts the wireless area SM-7 as a wireless area including the grid area identified by R#0408 from the plurality of wireless areas SM-q included in the wireless area MA-1. Next, at Step S307 in FIG. 15, the controller 30 determines the extracted wireless area SM-7 as a change target wireless area. Then, at step S308 in FIG. 15, the controller 30 stores information on the determined change target wireless area SM-7. The grid area identified by R#0408 is one example of the target location. The wireless area SM-7 is one example of the second wireless area.

In addition, at step S306 in FIG. 15, the controller 30 extracts the wireless areas SM-5 and SM-10 as wireless areas including the grid area identified by R#0507 from the plurality of wireless areas SM-q included in the wireless area MA-1.

In this example, it is assumed that an average throughput value for the wireless area SM-5 is greater than an average throughput value for the wireless area SM-10. Accordingly, at step S307 in FIG. 15, the controller 30 selects the wireless area SM-5 from the extracted wireless areas SM-5 and SM-10 and determines the selected wireless area SM-5 as a change target wireless area. Then, at step S308 in FIG. 15, the controller 30 stores information on the determined change target wireless area SM-5. The grid area identified by R#0507 is one example of the target location. The wireless area SM-5 is one example of the second wireless area.

Further, at Step S306 in FIG. 15, the controller 30 extracts the wireless areas SM-7 and SM-10 as wireless areas including the grid area identified by R#0508 from the plurality of wireless areas SM-q included in the wireless area MA-1.

In this example, it is assumed that an average throughput value for the wireless area SM-7 is greater than an average throughput value for the wireless area SM-10. Accordingly, at step S307 in FIG. 15, the controller 30 selects the wireless area SM-7 from the extracted wireless areas SM-7 and SM-10 and determines the selected wireless area SM-7 as a change target wireless area. Then, at step S308 in FIG. 15, the controller 30 stores information on the determined change target wireless area SM-7. The grid area identified by R#0508 is one example of the target location. The wireless area SM-7 is one example of the second wireless area.

Thereafter, at step S311 in FIG. 15, the controller 30 transmits a power change instruction to small base stations 10-5 and 10-7 respectively forming the stored change target wireless areas.

Each of the small base stations 10-5 and 10-7 receives the power change instruction from the controller 30. Then, the small base stations 10-5 and 10-7 change the respective radio signal transmission powers for the small base stations 10-5 and 10-7 from the first transmission power to the second transmission power, according to the received power change instruction.

Figure 19:
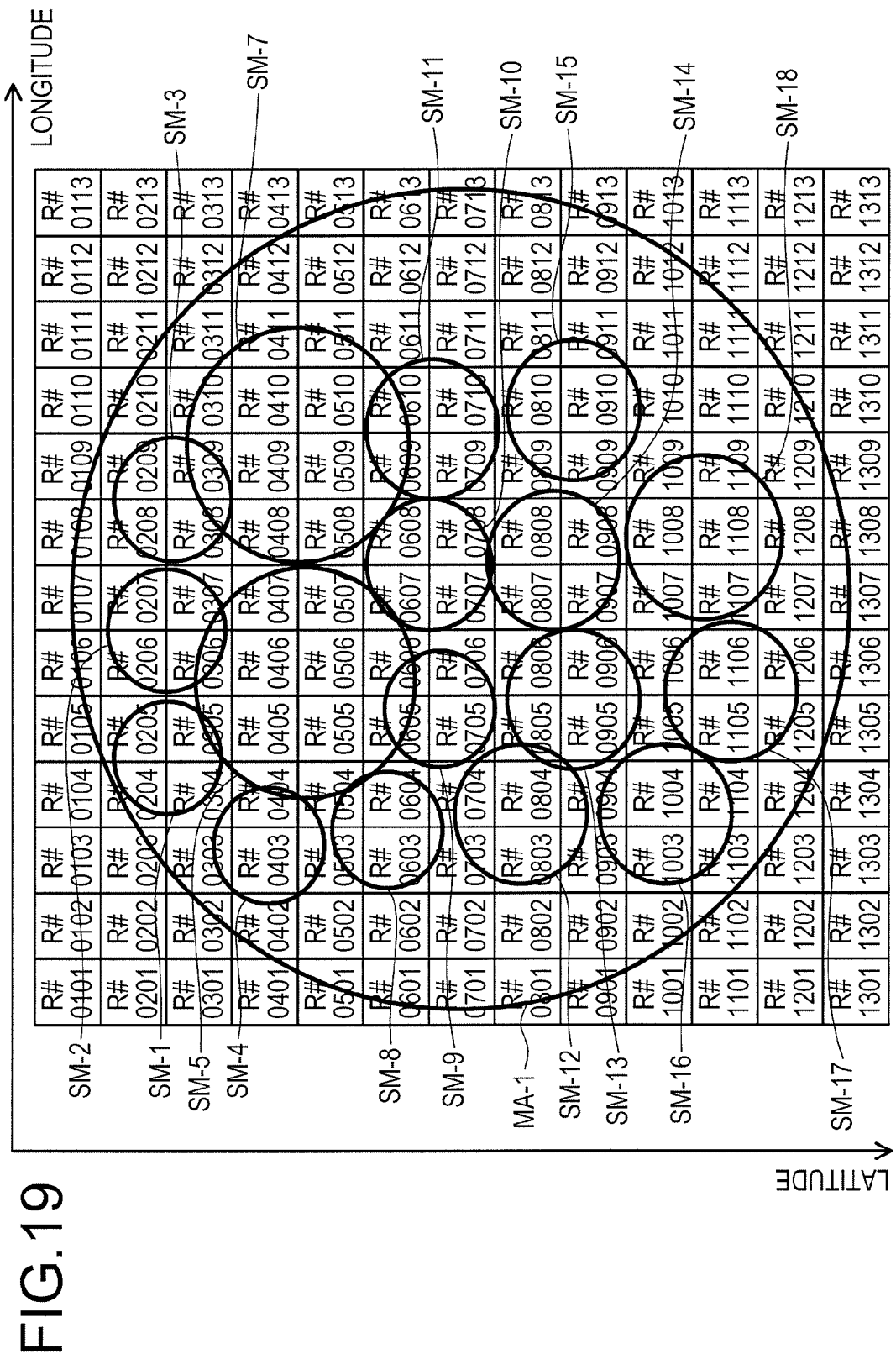
FIG. 19 is a diagram illustrating an example of a relationship between wireless areas and grid areas formed by base stations, according to an embodiment.

Thus, as illustrated in FIG. 19, the wireless areas SM-5 and SM-7 formed respectively by the small base stations 10-5 and 10-7 are enlarged. As a result, locations included in the wireless areas SM-5 and SM-7 formed respectively by the small base stations 10-5 and 10-7 are changed. As a result, the two grid areas identified by R#0407 and R#0507 are included in the wireless area SM-5. Further, the two grid areas identified by R#0408 and R#0508 are included in the wireless area SM-7.

Next, each of the small base stations 10-5 and 10-7 sends the controller 30 a power change response indicating that the change of the transmission power is completed.

On the other hand, when the stopped small base station 10-6 restarts, the controller 30 may send each of the small base stations 10-5 and 10-7 a power change instruction to change the radio signal transmission power from the second transmission power to the first transmission power. The restart of the small base station 10-6 may be represented as the recovery thereof.

As described above, the controller 30 according to the first embodiment stores the identification information, which identifies the locations included in the wireless areas WA-p which may be formed by each of the plurality of small base stations 10-p according to the transmission power control, for each of the small base stations 10-p. In addition, the controller 30 controls the transmission power of the small base stations 10-p capable of forming the second wireless area including the target location, based on the parameter indicating the radio communication capability at the target location identified by the identification information for the first wireless area.

This makes it possible to control the transmission power of the small base stations 10-p which is capable of forming wireless areas WA-p including locations where the radio communication capability is not good. This allows the small base stations 10-p to form the wireless areas WA-p including locations where the radio communication capability is not good, thereby improving the radio communication capability at the locations where the radio communication capability is not good.

In addition, in the first embodiment, the parameters includes a throughput representing the amount of data that are communicated per unit time between the mobile station 20 and the small base station 10-p forming the first wireless area. In addition, the target location is a location where the throughput is smaller than the first threshold value.

This makes it possible to control the transmission power of the small base stations 10-p which is capable of forming wireless areas WA-p including locations where the throughput is smaller than the first threshold value. This allows the small base stations 10-p to form wireless areas WA-p including locations where the throughput is smaller than the first threshold value, thereby increasing the throughputs at the locations where the throughput is smaller than the first threshold value.

In addition, in the first embodiment, a small base station 10-p whose transmission power is to be controlled is selected from among small base stations 10-p which are capable of forming the second wireless area. The selected small base station 10-p is a base station 10 having an average throughput value maximum among the small base stations 10-p, which is obtained by averaging the amount of data that are communicated per unit time between mobile stations 20 and a small base stations 10-p within the wireless area WA-p formed by the small base station 10-p.

A base station 10 having a large average value of throughputs for a wireless area WA is less likely to excessively decrease in the throughput in the wireless area WA even when the wireless area WA is expanded. According to the above-described configuration, the transmission power of the small base station 10-p having the maximum average of throughputs for the wireless area WA-p is controlled.

Accordingly, the throughput in the wireless area WA-p may be prevented from being reduced after the transmission power is changed.

In addition, the radio communications system 1 may form a SON (Self Organizing Network). The control of the transmission power for the base station 10 by the controller 30 may be one example of self-optimization. In addition, the control of the transmission power for the base station 10 by the controller 30 may be represented as a cell stop compensation or a cell automatic recovery.

In addition, in the radio communications system 1, the macro base station 10-0 may have the functionalities of the controller 30. In this case, the radio communications system 1 may not require the controller 30.

The operation of the radio communications system 1 in the case where the wireless area WA accommodating the mobile stations 20 is changed by stopping the small base station 10-$p$ has been described in the above examples.

However, even when the wireless area WA accommodating the mobile stations 20 is changed with a decrease in SNR or SINR without stopping the small base station 10-$p$, the radio communications system 1 operates in the same manner as the above examples. SNR is an abbreviation of Signal-Noise Ratio. SINR is an abbreviation of Signal-to-Interference-plus-Noise Ratio.

In addition, even when the throughput for the wireless area WA is reduced, for example, due to an excessive load of the small base station 10-$p$ with the wireless area WA accommodating the mobile stations 20 being unchanged, the radio communications system 1 operates in the same manner as the above examples.

In addition, the radio communications system 1 may include a plurality of macro base stations 10. In this case, the controller 30 may store a first wireless area identifier identifying a first wireless area WA formed by a first macro base station 10 and a second wireless area identifier identifying a second wireless area WA included in the first wireless area WA formed by the first macro base stations 10, in association with each other. In this case, the radio communications system 1 may perform the processes illustrated in FIGS. 13 to 15 for each of wireless areas WA formed by the plurality of macro base stations 10.

In addition, although the controller 30 determines whether or not the average throughput value is smaller than the first threshold value for each wireless area in the above examples, the controller 30 may determine whether or not the average throughput value is smaller than the first threshold value for each grid area. In this case, the controller 30 may extract grid areas having the average throughput value smaller than the first threshold value from among a plurality of grid areas and determine a change target wireless area for each of the extracted grid areas. In this case, the controller 30 may not require the first wireless area position information.

In addition, the controller 30 may store information indicating a difference between the first wireless area position information and the second wireless area position information, instead of the first wireless area position information or the second wireless area position information.

In addition, the controller 30 may store information identifying the locations included in the wireless areas WA-p which are able to be formed by the small base stations 10-$p$ by using three or more transmission powers, including the first and second transmission powers. In this case, the controller 30 may determine a wireless area WA-p which is able to be formed by the small base stations 10-$p$ by using smaller transmission power, as a change target wireless area.

In this case, the controller 30 may transmit a power change instruction including a transmission power used to form the wireless area WA-p determined as the change target wireless area.

For example, the controller 30 may store three or more pieces of wireless area position information, including the first and second wireless area position information, for each of the small base stations 10-$p$. In this case, for example, at step S306 in FIG. 15, the controller 30 may use a piece of wireless area position information corresponding to smaller transmission power to extract a wireless area as a candidate for the change target wireless areas.

The locations included in the wireless areas WA-p formed by the small base stations 10-$p$ are changed with the change in the transmission powers of the small base stations 10-$p$. The above-described configuration allows the wireless areas WA-p to be properly formed.

In addition, the controller 30 may store wireless area position information identifying locations included in the wireless areas which are able to be formed by the small base stations 10-$p$ by using a plurality of tilt angles of the antenna 15 included in each small base station 10-$p$, for each of the tilt angles. In this case, the controller 30 may transmit a tilt angle change instruction, along with a power change instruction. The tilt angle change instruction is information to instruct a change in tilt angle of the antenna 15. In this example, the tilt angle change instruction includes information indicating a tilt angle at which the antenna 15 is to be set.

In this case, each small base station 10-$p$ changes the tilt angle of the antenna 15 for the small base station 10-$p$, according to the received tilt angle change instruction. Accordingly, the locations included in the wireless areas WA-p formed by the small base stations 10-$p$ are changed.

The locations included in the wireless areas WA-p formed by the small base stations 10-$p$ are changed with the change in tilt angle of the antenna 15 provided for each small base station 10-$p$. Accordingly, the wireless areas WA-p may be properly formed with the above-described configuration.

Second Embodiment

Next, a radio communications system according to a second embodiment will be described. The radio communications system according to the second embodiment is different from the radio communications system according to the first embodiment in that a communication load is used instead of the throughput. The following descriptions will be focused on such differences. In the description about the second embodiment, the same elements as the first embodiment are denoted by the same reference numerals.

(Functionality; Base Station 10A)

Figure 20:
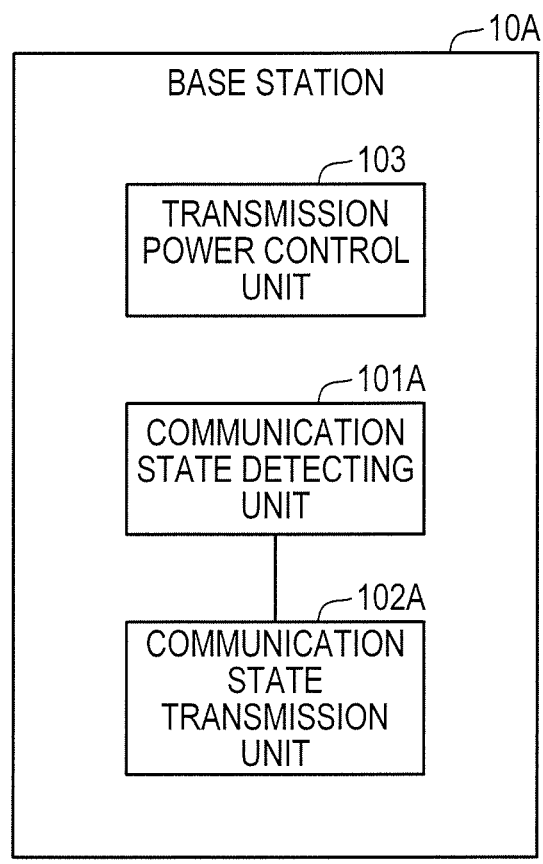
FIG. 20 is a diagram illustrating an example of functionality of a base station, according to an embodiment.

As illustrated in FIG. 20, the functionality of a base station 10A according to the second embodiment includes a communication state detecting unit 101A, and a communication state transmission unit 102A, instead of the communication state detecting unit 101, and the communication state transmission unit 102 illustrated in FIG. 6.

The communication state detecting unit 101A has the same functionality as the communication state detecting unit 101 except that the former uses a load of communication between the base station 10A and the mobile station 20, instead of the throughput.

The communication state detecting unit 101A measures a communication load for each of the mobile stations 20 accommodated in a wireless area WA formed by the base station 10A. The measurement of the communication load may be represented as an acquisition of the communication load. In this example, the communication load refers to a communication speed secured for communication between the mobile station 20 and the base station 10A. The communication speed represents the amount of data communicated per unit time. The secure of the communication speed may be represented as a reservation of the communication speed. The communication load is one example of a parameter representing a state of communication between the mobile station 20 and the base station 10A.

The communication state transmission unit 102A has the same functionality as the communication state transmission unit 102 except that the former uses the communication load instead of the throughput.

In this example, upon receiving a communication state request, the communication state transmission unit 102A transmits, to a controller 30A, the communication load and position information in association with each other, which have been acquired by the communication state detecting unit 101A for each of the mobile stations 20 accommodated in the wireless area WA formed by the base station 10A. The communication state transmission unit 102A may transmit the communication load and the position information to the controller 30A every time a predetermined period elapses.

(Configuration; Controller 30A)

Figure 21:
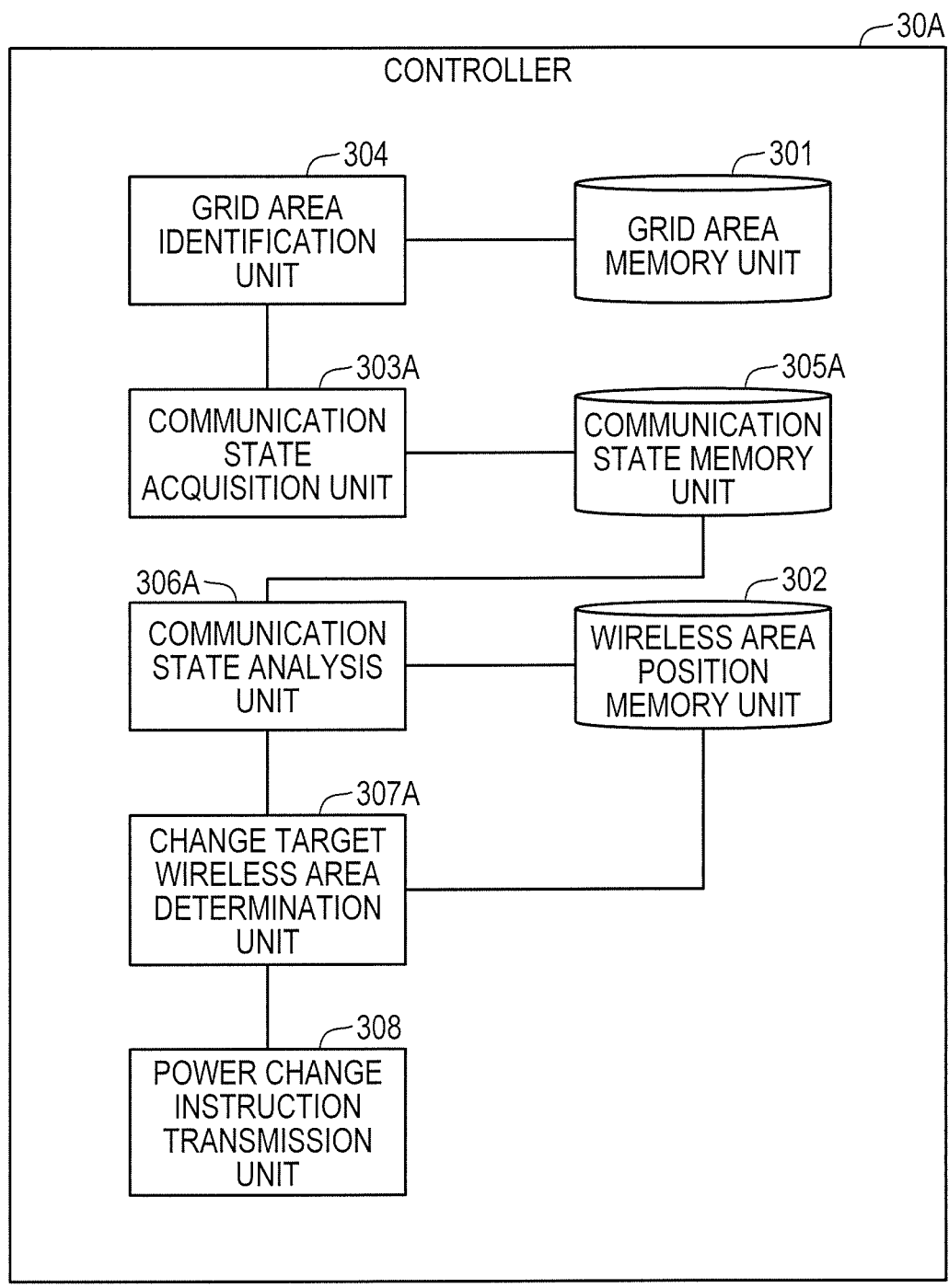
FIG. 21 is a diagram illustrating an example of functionality of a controller, according to an embodiment.

As illustrated in FIG. 21, the functionality of the controller 30A according to the second embodiment includes a communication state acquisition unit 303A, and a communication state memory unit 305A, instead of the communication state acquisition unit 303, and the communication state memory unit 305 illustrated in FIG. 7. In addition, as illustrated in FIG. 21, the functionality of the controller 30A includes a communication state analysis unit 306A, and a change target wireless area determination unit 307A, instead of the communication state analysis unit 306, and the a change target wireless area determination unit 307 illustrated in FIG. 7.

The communication state acquisition unit 303A has the same functionality as the communication state acquisition unit 303 except that the former uses the communication load instead of the throughput.

In this example, the communication state acquisition unit 303A receives the position information and the communication load in association with each other, from each base station 10A. The reception of the position information and the communication load is one example of an acquisition of the position information and the communication load.

The communication state memory unit 305A has the same functionality as the communication state memory unit 305 except that the former uses the communication load instead of the throughput.

The communication state memory unit 305A stores the communication load acquired by the communication state acquisition 303A in association with the grid areas that are identified, by the grid area identification unit 304, based on the position information associated with the communication load. In this example, the communication state memory unit 305A stores the communication load and the grid area identifiers in association with each other.

The communication state analysis unit 306A has the same functionality as the communication state analysis unit 306 except that the former uses the communication load instead of the throughput and except for how to extract a wireless area WA whose communication state is not good.

The communication state analysis unit 306A analyzes the communication states for each of wireless areas WA-p formed by each small base station 10-p. In this example, the analysis on the communication states includes calculating the sum of communication loads for a wireless area WA-p.

In this example, the communication state analysis unit 306A extracts, for each of wireless area identifiers, a communication load corresponding to a grid area identifier, which is associated with each wireless area identifier based on the first wireless area position information, from the communication loads stored in the communication state memory unit 305A. The communication state analysis unit 306A calculates the sum of extracted communication loads for each wireless area identifier.

The communication state analysis unit 306A extracts wireless areas WA whose communication states are not good, from the wireless areas WA-p formed by each small base station 10-p, based on a result of the analysis. In this example, the communication state analysis unit 306A extracts a wireless area WA having the sum of communication loads higher than a second threshold value, as a wireless area WA whose communication state is not good.

The change target wireless area determination unit 307A has the same functionality as the change target wireless area determination unit 307 except for how to select a change target wireless area when there exists a plurality of wireless areas WA-p as candidates for change target wireless areas.

In this example, the change target wireless area determination unit 307A selects a wireless area WA having the minimum sum of communication loads calculated by the communication state analysis unit 306A, from among a plurality of wireless areas WA-p as candidates for change target wireless areas. The change target wireless area determination unit 307A determines the selected wireless area WA-p as a change target wireless area.

In addition, the change target wireless area determination unit 307A may select a wireless area WA-p having the minimum sum of communication loads for the wireless areas WA-p which are able to be formed by the small base stations 10A-p by using the second transmission power. In this case, the sum of communication loads may be calculated by the communication state analysis unit 306A or the change target wireless area determination unit 307A.

(Operation)

Next, processes performed by the radio communications system 1 according to the second embodiment will be described with reference to FIGS. 22 and 23.

Figure 22:
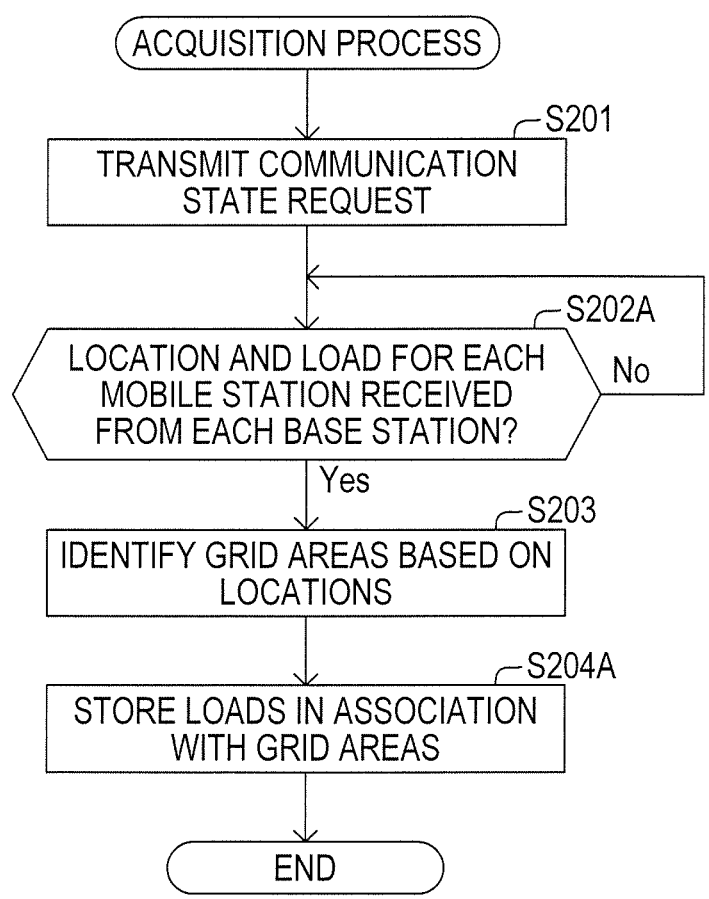
FIG. 22 is a diagram illustrating an example of an operational flowchart for an acquisition process performed by a controller, according to an embodiment.

The controller 30A performs an acquisition process illustrated in FIG. 22, instead of the acquisition process of FIG. 14. The acquisition process of FIG. 22 includes steps S202A and S204A replaced for the steps S202 and S204 in the process of FIG. 14.

At the starting of the process of FIG. 22, the controller 30A transmits a communication state request to each base station 10A (step S201 in FIG. 22).

Next, the controller 30A waits until it receives position information and a communication load for each mobile station 20 from each base station 10A ("NO" at step S202A in FIG. 22). Upon receiving the position information and the communication load for each mobile station 20 from each base station 10A ("YES" at step S202A in FIG. 22), the controller 30A identifies grid areas based on the received position information (step S203 in FIG. 22).

Thereafter, the controller 30A stores the received communication loads and the grid areas that are identified based on the position information received in association with the communication loads, in association with each other (step S204A in FIG. 22). Then, the controller 30A ends the acquisition process.

Figure 23:
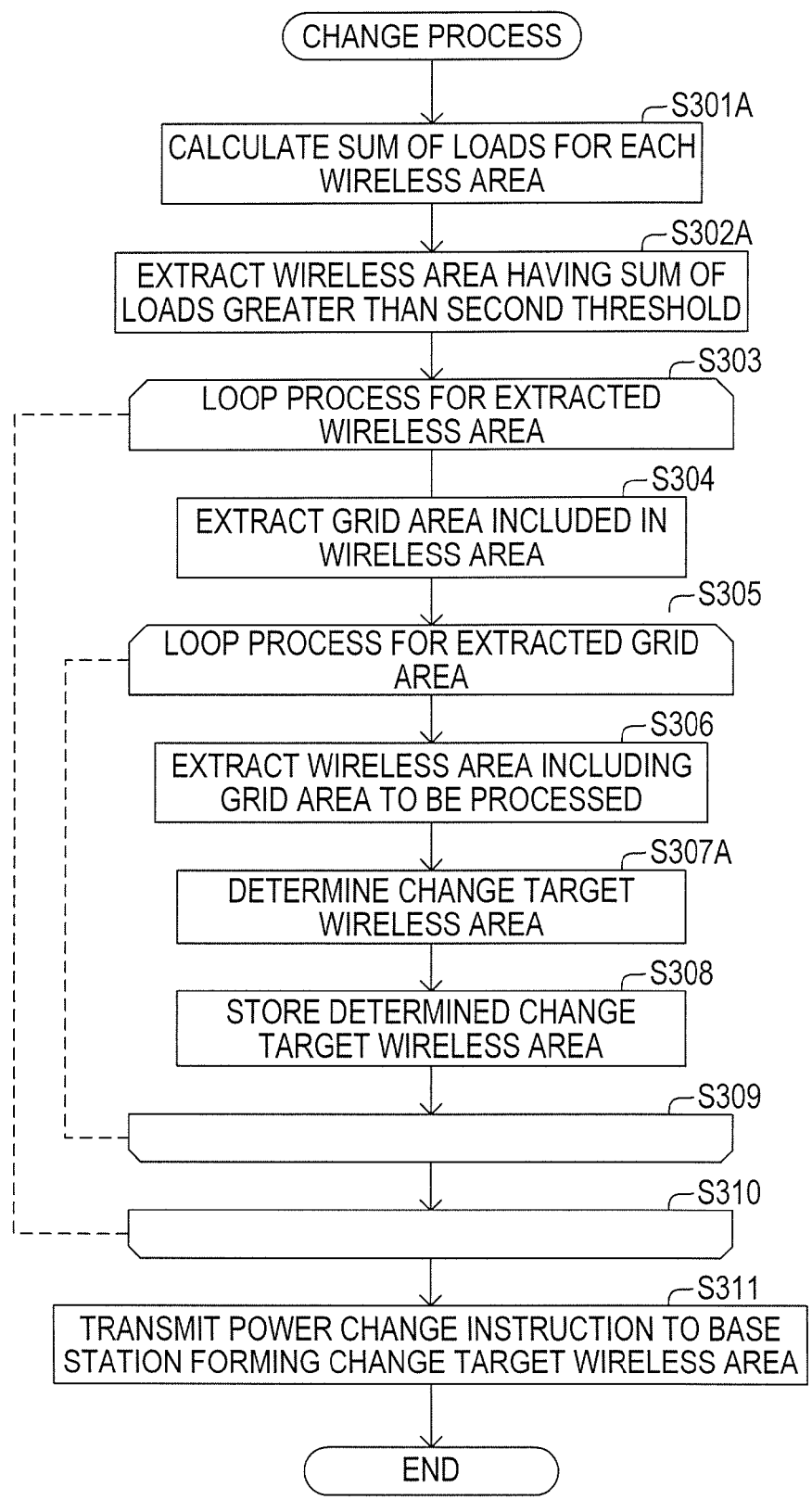
FIG. 23 is a diagram illustrating an example of an operational flowchart for a change process performed by a controller, according to an embodiment.

In addition, the controller 30A performs a change process illustrated in FIG. 23, instead of the change process of FIG. 15. The change process of FIG. 23 includes steps S301A, S302A and S307A replaced for the steps S301, S302 and S307 in the process of FIG. 15.

At the starting of the process of FIG. 23, the controller 30A calculates the sum of communication loads for each wireless area based on the communication loads that are stored in association with the grid areas (step S301A in FIG. 23). In this example, the controller 30A identifies the wireless areas including the grid areas, based on the first wireless area position information corresponding to the first transmission power.

Next, the controller 30A extracts wireless areas WA-p having the sum of communication loads higher than the second threshold value, from the wireless areas WA-p formed by each small base station 10A-p (step S302A in FIG. 23).

Then, the controller 30A performs a first loop process (steps S303 to S310 in FIG. 23) that sequentially uses the extracted wireless areas WA-p as a target to be processed.

In the first loop process, the controller 30A extracts grid areas included in the wireless area WP-p to be processed, from the plurality of grid areas, based on the first wireless area position information corresponding to the first transmission power (step S304 in FIG. 23).

Then, the controller 30A performs a second loop process (steps S305 to S309 in FIG. 23) that sequentially uses the extracted grid areas as a target to be processed.

In the second loop process, the controller 30A extracts wireless areas including the grid areas to be processed, from the wireless areas WA-p formed by each small base station 10A-p, based on the second wireless area position information corresponding to the second transmission power (step S306 in FIG. 23).

Next, the controller 30A determines a change target wireless area, based on the extracted wireless areas WA-p (Step S307A in FIG. 23).

In this example, when one wireless area WA-p is extracted, the controller 30A determines the extracted wireless area WA-p as the change target wireless area. In this example, when two or more wireless areas WA-p are extracted, the controller 30A selects one of the extracted wireless areas WA-p and determines the selected wireless area WA-p as the change target wireless area. In this case, the controller 30A selects a wireless area WA-p having the maximum sum of communication loads from among the extracted wireless areas WA-p.

Then, the controller 30A stores information on the determined change target wireless area (step S308 in FIG. 23).

Next, the controller 30A performs the second loop process (steps S305 to S309 in FIG. 23) for all of the grid areas extracted in Step S304, and then proceeds to step S310.

Thereafter, the controller 30A performs the first loop process (steps S303 to S310 in FIG. 23) for all of the wireless areas WA-p extracted in step S302A and then proceeds to step S311.

Next, the controller 30A transmits a power change instruction to a small base station 10A-p forming each of the change target wireless areas whose information is stored (step S311 in FIG. 23). Then, the controller 30A ends the change process.

As described above, the controller 30A according to the second embodiment stores the identification information, which identifies the locations included in the wireless areas WA-p which are able to be formed by each of the plurality of small base stations 10A-p according to the transmission power control, for each of the small base stations 10A-p. In addition, the controller 30A controls the transmission power of the small base stations 10A-p which are able to form the second wireless area including the target location, based on the parameter indicating the radio communication capability at the target location identified by the identification information for the first wireless area.

This makes it possible to control the transmission power of the small base stations 10-$p$ which are able to form wireless areas WA-p including locations where the radio communication capability is not good. This allows the small base stations 10A-p to form the wireless areas WA-p including locations where the radio communication capability is not good, thereby improving the radio communication capability at the locations where the radio communication capability is not good.

In addition, in the second embodiment, the parameters include a load of communication between the mobile station 20 and the small base station 10A-p forming the first wireless area. In addition, the target location is a location where the communication load is greater than the second threshold value.

This makes it possible to control the transmission power of the small base stations 10A-p which are able to form wireless areas WA-p including locations where the communication load is greater than the second threshold value. This allows the small base stations 10A-p to form wireless areas WA-p including locations where the communication load is greater than the second threshold value, thereby reducing the communication loads at the locations where the communication load is greater than the second threshold value.

In addition, in the second embodiment, a small base station 10A-p whose transmission power is to be controlled is selected from among the small base stations 10A-p which are able to form the second wireless area. The selected small base station 10A-p is a base station 10A having the minimum sum of communication loads between the mobile station 20 and the small base station 10A-p for the wireless area WA-p formed by the small base station 10A-p.

A base station 10A having the small sum of communication loads for a wireless area WA is less likely to excessively increase in the communication load in the wireless area WA even when the wireless area WA is expanded. According to the above-described configuration, the transmission power of the small base station 10A-p having the minimum sum of communication loads for the wireless area WA-p is controlled. Accordingly, the communication load in the wireless area WA-p may be prevented from being increased after the transmission power is changed.

In addition, the number of mobile stations 20 that are accommodated in the wireless area WA formed by the base station 10A may be used as a communication load. In this case, the sum of communication loads for the wireless area WA may be the total number of mobile stations 20 accommodated in the wireless area WA. In addition, the radio communications system 1 may use both of the throughput and the communication load as parameters indicating the communication state.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus comprising:
a memory configured to store first identification information in association with each of a plurality of base stations, the first identification information identifying locations included in a wireless area that is formed according to transmission power control by each of the plurality of base stations; and
a processor coupled to the memory, the processor being configured to control, based on parameters indicating wireless communication capability at a target location that is included in a first wireless area formed by a first base station and identified by the first identification information, transmission power of a second base station which forms a second wireless area including the target location.

2. The apparatus of claim 1, wherein
the parameters include a first throughput value indicating an amount of data that are communicated per unit time between the first base station and mobile stations located within the first wireless area; and
the target location is a location at which the first throughput value is smaller than a first threshold value.

3. The apparatus of claim 2, wherein
the second base station is a base station having an average throughput value that is maximum among candidate base stations which each form the second wireless area, the average throughput value being obtained by averaging second throughput values each indicating an amount of data that are communicated per unit time between the candidate base station and mobile stations located within the second wireless area.

4. The apparatus of claim 1, wherein
the parameters includes a first communication load indicating a load of communication between the first base station and mobile stations located within the first wireless area; and
the target location is a location at which the first communication load is greater than a second threshold value.

5. The apparatus of claim 4, wherein
the second base station is a base station having a total communication-load value that is minimum among candidate base stations which each form the second wireless area, the total communication-load value being obtained by summing up second communication-load values each indicating a load of communication between the candidate base station and mobile stations located within the second wireless area.

6. The apparatus of claim 1, wherein
the memory is configured to store, for each of the plurality of base stations, second identification information identifying locations included in a wireless area that is formed by the each base station by using each of a plurality of transmission powers of the each base station; and
the transmission power of the second base station is changed to one of the plurality of transmission powers.

7. The apparatus of claim 1, wherein
the memory is configured to store third identification information for each of a plurality of tilt angles of an antenna provided for each base station, the third identification information identifying locations included in a wireless area that is formed by the each base station by using each of the plurality of tilt angles; and
the processor changes the transmission power of the second base station while controlling the tilt angle of the antenna.

8. The apparatus of claim 1, wherein
the first identification information identifies locations by a grid that is formed based on a plurality of latitudes arranged at equal intervals and a plurality of longitudes arranged at equal intervals.

9. The apparatus of claim 1, wherein
the processor is configured to acquire a location of a mobile station and the parameters for the mobile station; and
the processor controls the transmission power of the second base station, based on the acquired location and parameters, and based on the stored identification information.

10. A method for controlling transmission power of a base station, the method comprising:
storing first identification information in association with each of a plurality of base stations, the first identification information identifying locations included in a wireless area that is formed according to transmission power control by each of the plurality of base stations; and
controlling, based on parameters indicating wireless communication capability at a target location that is included in a first wireless area formed by a first base station and identified by the first identification information, transmission power of a second base station which forms a second wireless area including the target location.

11. The method of claim 10, wherein
the parameters include a first throughput value indicating an amount of data that are communicated per unit time between the first base station and mobile stations located within the first wireless area; and
the target location is a location at which the first throughput value is smaller than a first threshold value.

12. The method of claim 11, wherein
the second base station is a base station having an average throughput value that is maximum among candidate base stations which each form the second wireless area, the average throughput value being obtained by averaging second throughput values each indicating an amount of data that are communicated per unit time between the candidate base station and mobile stations located within the second wireless area.

13. The method of claim 10, wherein
the parameters includes a first communication load indicating a load of communication between the first base station and mobile stations located within the first wireless area; and
the target location is a location at which the first communication load is greater than a second threshold value.

14. The method of claim 13, wherein
the second base station is a base station having a total communication-load value that is minimum among the candidate base stations which each form the second wireless area, the total communication-load value being obtained by summing up second communication-load values each indicating a load of communication between the candidate base station and mobile stations located within the second wireless area.

15. A system comprising:
a plurality of base stations;
a plurality of mobile stations wirelessly communicating with the plurality of base stations; and
a controller including:
- a memory configured to store first identification information in association with each of the plurality of base stations, the first identification information identifying locations included in a wireless area that is formed according to transmission power control by each of the plurality of base stations, and
- a processor coupled to the memory, the processor being configured to control, based on parameters indicating wireless communication capability at a target location that is included in a first wireless area formed by a first base station and identified by the first identification information, transmission power of a second base station which forms a second wireless area including the target location.

16. The system of claim 15, wherein
the parameters include a first throughput value indicating an amount of data that are communicated per unit time between the first base station and mobile stations located within the first wireless area; and
the target location is a location at which the first throughput value is smaller than a first threshold value.

17. The system of claim 16, wherein
the second base station is a base station having an average throughput value that is maximum among candidate base stations which each form the second wireless area, the average throughput value being obtained by averaging second throughput values each indicating an amount of data that are communicated per unit time between the candidate base station and mobile stations located within the second wireless area.

18. The system of claim 15, wherein
the parameters includes a first communication load indicating a load of communication between the first base station and mobile stations located within the first wireless area; and
the target location is a location at which the first communication load is greater than a second threshold value.

19. The system of claim 18, wherein
the second base station is a base station having a total communication-load value that is minimum among candidate base stations which each form the second wireless area, the total communication-load value being obtained by summing up second communication-load values each indicating a load of communication between the candidate base station and mobile stations located within the second wireless area.

* * * * *